(12) United States Patent
Nakao et al.

(10) Patent No.: US 12,099,014 B2
(45) Date of Patent: Sep. 24, 2024

(54) BUBBLE MEASUREMENT DEVICE

(71) Applicant: SUMITOMO METAL MINING CO., LTD., Tokyo (JP)

(72) Inventors: Yoshihiko Nakao, Ehime (JP); Shintaro Ishikawa, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 281 days.

(21) Appl. No.: 17/821,872

(22) Filed: Aug. 24, 2022

(65) Prior Publication Data

US 2022/0404288 A1    Dec. 22, 2022

Related U.S. Application Data

(63) Continuation of application No. PCT/JP2021/007890, filed on Mar. 2, 2021.

(30) Foreign Application Priority Data

Mar. 4, 2020   (JP) .................................. 2020-036982
Mar. 23, 2020  (JP) .................................. 2020-051306

(51) Int. Cl.
*G01N 21/85* (2006.01)
*B01D 21/00* (2006.01)
(Continued)

(52) U.S. Cl.
CPC .......... *G01N 21/85* (2013.01); *B01D 21/0084* (2013.01); *C02F 1/24* (2013.01); *G01N 21/03* (2013.01)

(58) Field of Classification Search
CPC .. G01N 15/0205; G01N 15/06; G01N 15/075; G01N 15/1433; G01N 15/1459;
(Continued)

(56) References Cited

U.S. PATENT DOCUMENTS 4,981,582 A  *  1/1991  Yoon .................. B01F 25/43151
                                                 261/122.1
11,857,893 B2 *  1/2024  Seguin ................. B01D 17/047
(Continued)

FOREIGN PATENT DOCUMENTS

BR    102014025371 A2  *  5/2016   ............. B03D 1/028
CN        104596898        5/2015
(Continued)

OTHER PUBLICATIONS

International Search Report mailed on Apr. 27, 2021 with respect to PCT/JP2021/007890.
(Continued)

*Primary Examiner* — Andre J Allen
(74) *Attorney, Agent, or Firm* — IPUSA, PLLC

(57) ABSTRACT

In a bubble measurement device for measuring bubbles moving in a liquid, the bubble measurement device includes a measurement chamber in which the bubbles in the liquid containing solid materials are introduced into the measurement chamber from below the measurement chamber, and providing a transparent slope facing diagonally downward at a position where the introduced bubbles rise, an image capturing device to capture an image of the bubbles passing the transparent slope, an introduction pipe provided below the measurement chamber to introduce the bubbles into the measurement chamber, and a bubble introduction valve that is immersed in the liquid to be measured and performs the introduction and blocking of the bubbles into the introduction pipe.

15 Claims, 11 Drawing Sheets

(51) Int. Cl.
*C02F 1/24* (2023.01)
*G01N 21/03* (2006.01)

(58) Field of Classification Search
CPC ......... G01N 15/147; G01N 2015/0011; G01N 2015/1486; G01N 2015/1493; G01N 21/03; G01N 21/85; B01D 21/0084
See application file for complete search history.

(56) References Cited

U.S. PATENT DOCUMENTS

2021/0010917 A1\* 1/2021 Ishikawa ............ G01N 15/1459
2024/0009683 A1\* 1/2024 Fujita ..................... B03D 1/008

FOREIGN PATENT DOCUMENTS

| | | | |
|---|---|---|---|
| CN | 105021231 B | \* | 5/2017 |
| CN | 105319161 B | \* | 10/2018 ............. G01N 21/01 |
| CN | 208780611 U | | 4/2019 |
| CN | 214584235 U | \* | 11/2021 |
| CN | 219519187 U | \* | 8/2023 |
| CN | 220819833 U | \* | 4/2024 |
| JP | 2011-247748 | | 12/2011 |
| JP | 2019-206985 | | 12/2019 |
| WO | 2019/189117 | | 10/2019 |

OTHER PUBLICATIONS

Shahbazi, Benzad et al., "Bubble-particle collision and attachment probability on fine particles flotation", Chemical Engineering and Processing, 2010, vol. 49, pp. 622-627.

\* cited by examiner

FIG.9

| SAMPLE | LENGTH OF INTRODUCTION PIPE | SIZE OF INTRODUCTION PIPE | AMOUNT OF AIR SUPPLIED | SIZE OF BUBBLE | ORE PARTICLE SIZE IN THE SLURRY | SLURRY CONCENTRATION | OPENING TIME OF BUBBLE INTRODUCTION VALVE |
|---|---|---|---|---|---|---|---|
| EXAMPLE 1 | 200 mm OR MORE AND LESS THAN 500 mm (7 TIMES OR MORE AND LESS THAN 20 TIMES OF INNER SIZE OF INTRODUCTION PIPE) | | 4.0 L/min OR LESS, GREATER THAN 0.6 L/min | 20 μm OR MORE | MAXIMUM PARTICLE SIZE ≤ 300 μm, D50 ≈ LESS THAN 100 μm | LESS THAN 50 wt% | OK IN 10 SECONDS OR LESS |
| COMPARATIVE EXAMPLE 1 | | | | | | | UNACCEPTABLE IN GREATER THAN 10 SECONDS |
| EXAMPLE 2 | | 5 mm OR MORE AND 30 mm OR LESS (50 mm OR LESS) | 0.6 L/min OR LESS, GREATER THAN 0.2 L/min | | | | OK IN 40 SECONDS OR LESS |
| COMPARATIVE EXAMPLE 2 | | | | | | | UNACCEPTABLE IN GREATER THAN 40 SECONDS |
| EXAMPLE 3 | 500 mm OR MORE (20 TIMES OR MORE OF INNER SIZE OF INTRODUCTION PIPE) | | 4.0 L/min OR LESS, GREATER THAN 0.2 L/min | | | | OK IN 60 SECONDS OR LESS |
| COMPARATIVE EXAMPLE 3 | | | | | | | UNACCEPTABLE IN GREATER THAN 60 SECONDS |

BUBBLE MEASUREMENT DEVICE

CROSS-REFERENCE TO RELATED APPLICATION

This U.S. non-provisional application is a continuation of PCT International Application PCT/JP2021/007890 filed on Mar. 2, 2021 and designated the U.S., which is based on and claims priority to Japanese Patent Applications No. 2020-036982, filed Mar. 4, 2020 and No. 2020-051306, filed Mar. 23, 2020, with the Japan Patent Office. The entire contents of these applications are incorporated herein by reference.

TECHNICAL FIELD

The present invention relates to a bubble measurement device and a method of measuring bubbles.

BACKGROUND ART

A flotation method (hereinafter also referred to as a flotation) that has been widely performed in ore-dressing that separates a useful metal a method that attaches particles of a hydrophobic useful metal to bubbles in a solution to separate them from unnecessary minerals. An Agitair-type flotation machine, which is one of the flotation machines, is known.

In flotation, contact between mineral particles and bubbles in ore slurry is an important mechanism. With respect to the contact probability, the size of bubbles is known to be an important factor, and attempts have been made to determine the size of bubbles. Bubbles generated in fresh water, seawater, or other non-solid liquids have been reported in many cases to be measured using a backlight technique in which bubbles are introduced into a measurement chamber together with the liquid.

For example, a method for taking clear images is disclosed in Patent Document 1. The method disclosed in Patent Document 1 discloses a method of collecting bubbles in a slurry by opening an air drive valve for a predetermined period of time.

However, there has been a problem in the configuration disclosed in Patent Document 1 in that a turbidity flows into a device slightly later than the bubbles or at the same time as the bubbles, resulting in extremely low transparency of the liquid. Therefore, taking clear images becomes difficult, and identifying the bubbles in the captured image becomes difficult because the bubbles are lost in the mineral particles.

In the floatation machine, air is introduced into a floatation tank where the slurry is stored to generate bubbles, thereby depositing useful metals on the bubbles. In order to efficiently perform floatation, the size and quantity of the bubbles generated are needed to be properly determined and these must be properly maintained.

As a method of properly determining the size and quantity of the generated bubbles, for example, a method of measuring the distribution of the size of bubbles by backlight photography has been reported in many cases. However, these methods are based on the measurement of bubbles generated in solid-particle-free liquids such as fresh water and seawater, and are not based on the measurement of bubbles generated in ore slurries where the transparency of the liquid is extremely low and capturing clear images are difficult. Thus, there is a need for a more advantageous method that allows for capturing sharp images even in ore slurries with very low transparency.

A method for taking clear images is disclosed in Patent Document 1. The method disclosed in Patent Document 1 discloses a method of collecting bubbles in a slurry by opening an air drive valve for a predetermined period of time. However, turbidity flows into a device slightly later than the bubbles or at the same time as the bubbles. Therefore, there are problems in which only a short period of time of image-capturing can be performed, or repeated image-capturing cannot be performed. In addition, turbidity flowing into the device is needed to be removed by cleaning after removal of the device from the slurry and is inefficient.

In the floatation, bubbles with a small bubble size can be used, thereby improving a yield of bubbles. In particular, a bubble with a size of 1 to 100 μm is expected to have potential applications in the floatation.

However, the small bubbles described above are highly adhesive, the small bubbles adhere to the inside of the bubble size measurement device, and the size and quantity of the generated bubbles cannot be properly determined.

As a method dealing with this problem, for example, the method in Patent Document 2 is disclosed. The method in Patent Document 2 is a method of providing a membrane for preventing bubble deposition in a chamber and introducing a water flow into the chamber. However, even in this method, countermeasure against turbidity has not been taken and a method is not disclosed which can effectively function as a measurement system practical in a flotation process or a microbubble generation process.

RELATED ART DOCUMENTS

Patent Documents

[Patent Document 1] Japanese Patent Application Laid-Open No. 2019-206985
[Patent Document 2] International Publication No. WO 2019/189117

SUMMARY OF INVENTION

Problem to be Solved by the Invention

Accordingly, an object of the present invention is to provide a bubble measurement device and a method of measuring bubbles that can properly measure the size of bubbles by capturing sharp images of the bubble by eliminating the effect of the ore slurry.

Another object of the present invention is to provide a bubble measurement device and a method of measuring bubbles by which, in order to solve a situation in which the size and quantity of generated bubbles are not properly determined, clear images can be taken even when a liquid containing solid particles is targeted, and the size and quantity of generated bubbles can be properly determined and efficient image-capturing can be performed even when liquid containing microscopic bubbles is also targeted.

Means for Solving Problems

In order to achieve the above-described object, in a method of measuring bubbles using a bubble measurement device, the bubble measurement device includes a measurement chamber introducing bubbles in a liquid containing solid materials into the measurement chamber from below the measurement chamber, and providing a transparent slope facing diagonally downward at a position where the introduced bubbles rise; an image capturing device to capture an image of the bubbles passing the transparent slope; an introduction pipe provided below the measurement chamber to introduce the bubbles into the measurement chamber; and a bubble introduction valve that is immersed in the liquid containing bubbles to be measured and performs the introduction of bubbles into the introduction pipe and blocking of the bubbles from entering into the introduction pipe, the method includes capturing the image of the bubbles with the image capturing device; determining an introduction time of the bubbles to the introduction pipe during which the capable contained in the liquid and the solid materials are both identifiable, according to a shape of the introduction pipe, properties of the liquid, and an amount of air supplied to the liquid; and measuring the bubbles by adjusting an opening time of the bubble introduction valve to the introduction time of the bubbles to the introduction pipe during which bubbles contained in the liquid and the solid materials are both identifiable.

In order to achieve the above-described object, the bubble measurement device according to one aspect of the present invention is a bubble measurement device for measuring bubbles moving in a liquid, the bubble measurement device includes a measurement chamber holding the liquid, introducing the bubbles in the liquid into the measurement chamber from below the measurement chamber, and providing a transparent slope facing diagonally downward at a position where the introduced bubbles rise; an image capturing device to capture an image of the bubbles passing the transparent slope; an introduction pipe provided below the measurement chamber to introduce the bubbles into the measurement chamber; and a bubble introduction valve that is immersed in the liquid containing bubbles to be measured and performs the introduction of bubbles into the introduction pipe and blocking of the bubbles from entering into the introduction pipe;

a first opening/closing valve disposed above the measurement chamber to shut off a supply or draining of an observation solution to the measurement chamber; and a second opening/closing valve disposed below the measurement chamber to shut off a supply or drain of the observation solution to the measurement chamber, wherein an opening time of the bubble introduction valve is determined according to a shape of the introduction pipe, properties of the liquid, and an amount of air supplied into the liquid, and the opening time of the bubble introduction valve is adjusted to a predetermined time so that the bubbles contained in the liquid and the solid materials are distinguishable when the image of the bubbles in the measurement chamber is captured by the image capturing device.

Effects of the Invention

According to the present invention, the effect of turbidity due to ore slurry can be suppressed and bubbles can be measured reliably.

In addition, according to the present invention, when a liquid containing solid particles is targeted, capturing sharp images can be performed, and when a liquid containing microscopic bubbles is also targeted, efficient image-capturing can be performed, and the size and quantity of generated bubbles can be properly determined.

BRIEF DESCRIPTION OF DRAWINGS

FIG. 9 is a view illustrating the results of Examples and Comparative Examples;

MODE FOR CARRYING OUT THE INVENTION

Hereinafter, embodiments for carrying out the present invention will be described with reference to the drawings.

First Embodiment

Figure 1:
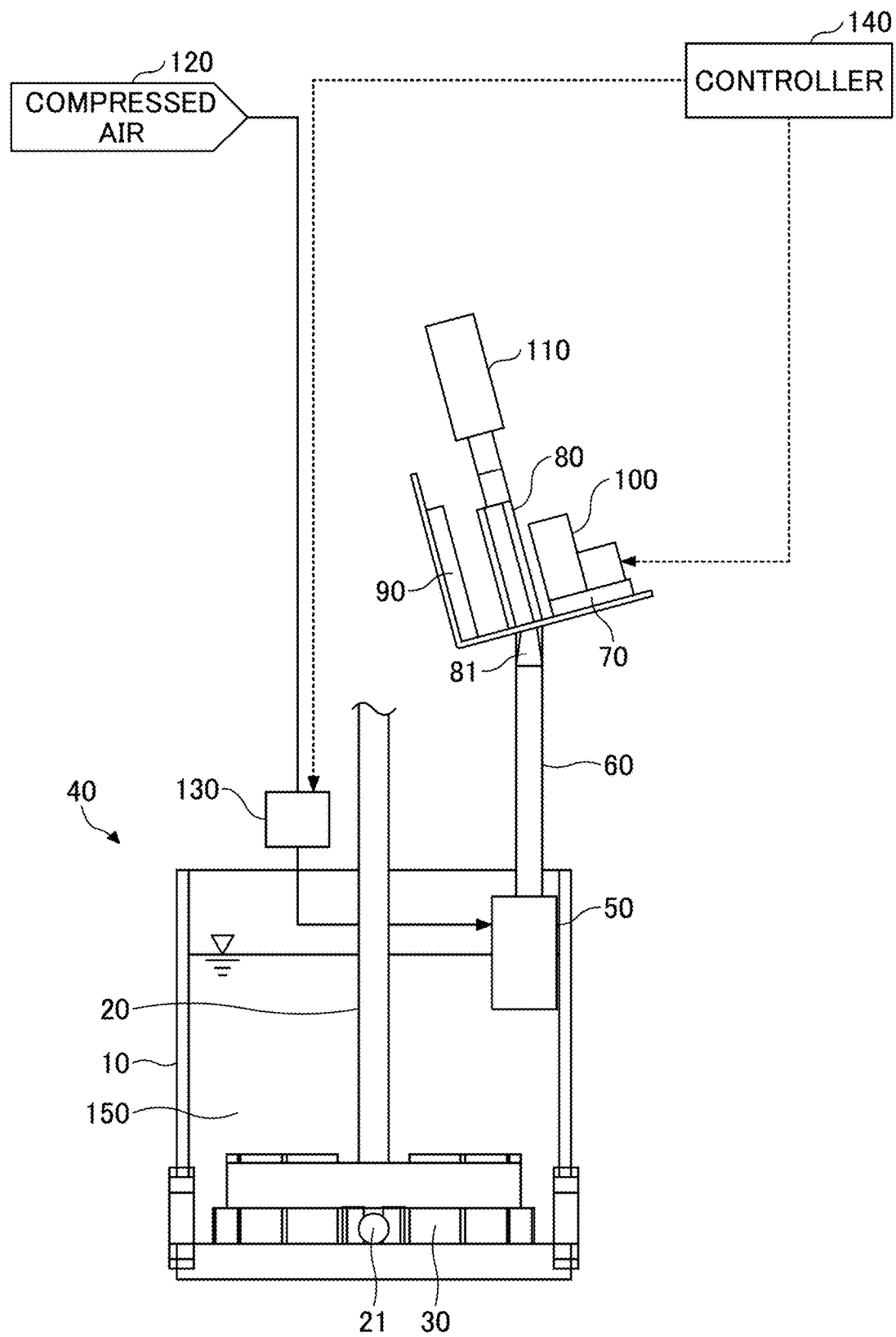
FIG. 1 is a schematic diagram illustrating the structure of a bubble measurement device and a flotation machine to which a bubble measurement device is applied in an embodiment of the present invention.

FIG. 1 is a schematic diagram illustrating the structure of a bubble measurement device and a flotation machine to which a bubble measurement device is applied in the first embodiment. The bubble measurement device of the first embodiment of the present invention includes a bubble introduction valve 50, an introduction pipe 60, a frame 70, a measurement chamber 80, a light projection device 90, an image capturing device 100, and an upper valve 110. Optionally, an air source 120, an opening/closing solenoid valve 130, and a controller 140 may also be provided.

A flotation machine 40 to which the bubble measurement device of the present embodiment is applied includes a flotation tank 10, an air supply shaft 20, and an agitator blade 30. Also, as a related component of the flotation machine 40 and the bubble measurement device, ore slurry 150 is stored in the flotation tank 10.

Commonly used various flotation machines may be used as the flotation machine 40 in accordance with the present embodiment, for example, an Agitair-type flotation machine or a Denver-type flotation machine.

The flotation tank 10 is a slurry storage device for storing a liquid ore slurry 150 containing the pulverized materials to be ore-dressed. The ore slurry 150 is formed from ores and liquids. Air is supplied into the ore slurry 150, and the air becomes bubbles so as to float the ores to perform floatation and collect useful metals.

The air supply shaft 20 is an air supply device for supplying air (air) from the lower end thereof. As described above, air is supplied into the ore slurry 150 to generate bubbles to float the ore. For example, the lower end of the air supply shaft 20 is disposed near the bottom surface of the flotation tank 10 to generate bubbles near the bottom surface of the flotation tank 10.

The agitator blade 30 is a bubble micronizing device for reducing the size of bubbles generated by air supplied from the lower end of the air supply shaft 20. The bubbles generated at the lower end of the air supply shaft 20, that is, the center of the agitator blade 30, collide with the agitator blade 30 by rotation of the agitator blade 30 when the bubbles are discharged from the agitator blade 30, thereby reducing the size of bubbles.

The sizes, density, and the like of bubbles affect flotation performance. Therefore, it is important to measure and control bubbles to improve flotation performance. A bubble measurement device of the present embodiment is used to measure the bubble size, bubble density, and the like.

The bubble measurement device includes a bubble introduction valve 50 at lower end of the device and an introduction pipe 60 above the bubble introduction valve 50. A frame 70 is provided at the upper end of the introduction pipe 60, and a measurement chamber 80, an image capturing device 100, and a light projection device 90 are provided on the frame 70. An upper valve 110 is provided above the measurement chamber 80. In the case where the bubble introduction valve 50 is, for example, air-driven, the air source 120, the opening/closing solenoid valve 130, and the controller 140 for driving the opening/closing solenoid valve 130 are provided as necessary.

The measurement of bubbles is specifically performed as follows.

First, bubbles are introduced from the bubble introduction valve 50 and the introduced bubbles are introduced into the measurement chamber 80 via the introduction pipe 60. Light is emitted to the measurement chamber 80 from the light projection device 90, the image capturing device 100 captures the bubbles in the measurement chamber 80, acquires the necessary information to measure the bubble size, the density of the bubbles, and the like from the captured images, and measures the values thereof. In measuring bubbles, the measurement chamber 80 is initially filled with a clear liquid, but the clear liquid becomes turbid in the measurement chamber 80 because the mineral slurry is also introduced when introducing the bubbles. A high degree of turbidity makes it difficult to distinguish bubbles from ores (solids) and to measure bubbles accurately.

Accordingly, in the bubble measurement device and the method of measuring bubbles of the present embodiment, the bubble measurement device and the method of measuring bubbles to suppress such turbidity are provided.

Hereinafter, the components constituting the bubble measurement device of the present embodiment will be described in detail.

(Bubble Introduction Valve)

In the present embodiment, the bubble introduction valve 50 is a valve body which is capable of switching between a state in which the ore slurry 150 such as a liquid containing solid materials can be moved and a state in which the movement of the ore slurry 150 is blocked. The bubble introduction valve 50 is fitted to the lower end of the introduction pipe 60 and is immersed in the liquid to be measured.

Further, the bubble introduction valve 50 is preferably a valve body that allows flow passage when the valve is opened. This effectively prevents bubbles from remaining inside the valve body. Valves that satisfy such requirements include, for example, mechanical valves such as ball valves, gate valves, butterfly valves, and the like; and air-inflating valves having elastic deforming members in the valves; and the like.

In the bubble measurement device of the present embodiment, the bubble introduction valve 50 is adjusted so that the amount of the ore slurry 150 introduced into the measurement chamber 80 is within a level that does not interfere with the image-capturing of the bubbles. In other words, instead of keeping the bubble introduction valve 50 open continuously, the valve is kept open for only a certain period of time, and thus the bubbles are introduced for only the certain for only a certain period of time. These bubbles that are introduced are measured in the measurement chamber 80.

The time to open the valve is adjusted according to the shape of the introduction pipe 60, the properties of the liquid constituting the ore slurry 150, and the amount of air supplied into the liquid, as will be described in more detail later.

(Introduction Pipe)

In the present embodiment, the introduction pipe 60 is a pipe having open cylindrical cross-sections at both ends. The bubble introduction valve 50 is provided at the end of the pipe 60 so that the bubble introduction valve 50 is immersed in the liquid, and an introduction pipe connecter 81 is provided at the end of the pipe 60 on the measurement chamber 80 side.

The shape of the introduction pipe 60 is a major factor in determining how much solid materials in the ore slurry 150 reach the measurement chamber 80. If the introduction pipe 60 is long enough, the amount of solids in the ore slurry 150, particularly particles of particle size less than the lower limit of the discrimination limit of the image capturing device, can be suppressed from reaching the measurement chamber 80. That is, if the path from the bubble introduction valve 50 to the measurement chamber 80 is long, it is difficult for solid materials to reach the measurement chamber 80, and turbidity in the measurement chamber 80 can be suppressed.

Specific values that can sufficiently suppress the solid materials from reaching the measurement chamber 80 in the ore slurry 150 will be described later.

(Measurement Chamber)

Figure 2A:
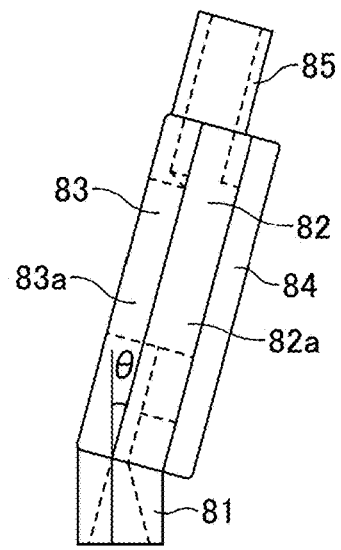
FIG. 2A is an enlarged view of a measurement chamber.
Figure 2B:
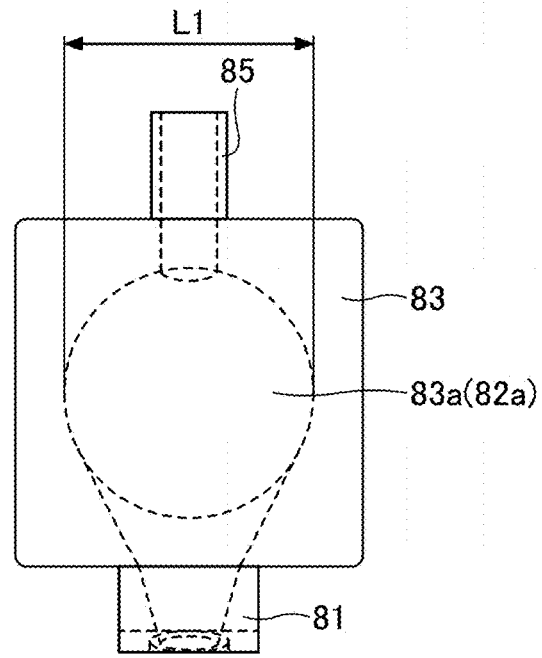
FIG. 2B is an enlarged view of a measurement chamber.

FIGS. 2A and 2B are enlarged views of the measurement chamber 80. FIG. 2A is a side view of the measurement chamber 80, and FIG. 2B is a front view of the measurement chamber 80.

In the present embodiment, the measurement chamber 80 is composed of a plurality of clear members. In the present embodiment, the material of these members is vinyl chloride. As the material of the member, a member having a high light transmittance may be suitably used so that the light emitted from the light projection device 90 can be transmitted through the measurement chamber 80 and measured by the image capturing device 100. In the visible light range from 400 nm to 700 mm, the light transmittance of the member is preferably 80% or more and more preferably 90% or more.

Glass, an acrylic, polyethylene terephthalate (PET), a polycarbonate, or the like may be used as the member satisfying the above-described optical properties in addition to vinyl chloride.

Vinyl chloride is inexpensive, easy to process, and transparency. Therefore, vinyl chloride can be suitably used for a member of the measurement chamber 80. In addition, acrylic is also clearer than vinyl chloride, less scratchy, and is unlikely to decrease in transparency, and can be suitably used for installation in places where replacement is difficult.

The measurement chamber 80 is provided with a main member 82 and a first cover member 83 and a second cover member 84 so as to sandwich the main member 82. The contour of the main member 82 is in the form of a thick square plate, that is, a flat square pillar. The main member 82 is provided with a measuring hole 82*a* having a relatively large size. The axial direction of the measuring hole 82*a* coincides with the thickness direction (this direction may be referred to as the thickness direction of the main member 82) of the thinnest square-pillar shape of the main member 82. When the main member 82 is sandwiched between the first cover member 83 and the second cover member 84 so as to block the measuring hole 82*a*, the portion of the measuring hole 82*a* becomes a space closed in the axial direction of the measuring hole 82*a*.

Of the spaces composed of the main member 82, the first cover member 83, and the second cover member 84, the right side of the first cover member 83 is called a transparent slope, and the part of the transparent slope in which the measuring hole 82*a* is positioned is called the measuring portion 83*a*.

The measurement chamber 80 further includes an introduction pipe connector 81 provided beneath the main member 82 and a delivery pipe 85 provided above the main member 82 to which the introduction pipe connector 81 connects the introduction pipe 60. Here, the introduction pipe connector 81 has a through hole, and both the introduction pipe 60 and the delivery pipe 85 are tubular structures, so that the measurement chamber 80 communicates vertically through these members. Such communication allows for retaining the liquid in the measurement chamber 80 and introduces bubbles in the liquid from the introduction pipe 60.

The introduction pipe 60, which is connected to the introduction pipe connector 81, is positioned so that the axis of the inner surface of the pipe is vertical. The upper surface of the introduction pipe connector 81 connected to the introduction pipe 60 is inclined by an inclined angle $\theta$ from the horizontal surface. As a result of this tilting of the upper surface of the introduction pipe connector 81, the transparent slope including the measuring portion 83*a* is inclined by an inclination angle $\theta$ from the vertical. That is, the normal of the transparent slope becomes downward, and the transparent slope is downwardly inclined. The inclined angle $\theta$ is determined so that the transparent slope is positioned at the position from which bubbles rise from the introduction port. In the present embodiment, the inclined angle $\theta$ is 15 degrees, but may be set to various angles depending on the application. In addition, by tilting the measuring portion 83*a*, it is possible to capture the image of the bubbles while focusing on all the bubbles.

Bubbles that have risen in the liquid due to the inclined angle $\theta$ of the transparent slope are in contact with the transparent slope including the measuring portion 83*a*, and bubbles greater than or equal to a certain size rise along this transparent slope. This rising of bubbles prevents overlapping of bubbles. Therefore, the size and quantity of bubbles can be accurately measured. At this time, there is little movement of the liquid containing bubbles.

The size L1 of the measuring hole 82*a* of the main member 82 constituting the bubble measurement device of the present embodiment is larger than the size of the inner surface of the introduction pipe 60. Here, the size L1 of the measuring hole 82*a* is the length in the right and left directions of the measuring portion 83*a* when the transparent slope is viewed from the front.

The main member 82 is provided with a measuring hole 82*a* as described above, and an enlarged communication portion is provided for communicating the measuring hole 82*a* with the introduction pipe 60. The enlarged connection is groove shaped. The length of the groove of the enlarged communication portion in the right and left directions to the measuring portion 83*a* is lengthened from the lower side to the upper side in a constant ratio. The depth of the groove shape of the enlarged communication portion has a depth of ⅓ of the length of the thickness direction of the main member 82.

(Light Projection Device and Image Capturing Device)

The light projection device 90 emits light of a predetermined type from one side of the measurement chamber 80 to the measuring portion 83*a*. This facilitates image capturing within the measurement chamber 80. As the illumination device, for example, surface illumination such as a white LED is preferably used.

The image capturing device 100 is preferably a digital camera or the like capable of capturing at least either a still image or a movie. The size and quantity of bubbles captured by the image capturing device 100 are preferably analyzed by a software that performs image processing. The image capturing device 100 may use one of a variety of image capturing devices as long as the image of the bubbles can be appropriately captured. For example, the image capturing device 100 may use a continuous image capturing device having an image-capturing speed of 3.3 fps.

Other Components

The frame 70 is a support member for supporting the measurement chamber 80, the light projection device 90, and the image capturing device 100.

A upper valve 110 is a valve for introducing and draining clear liquid in the measurement chamber 80 and may be configured by, for example, a manual valve. The clear liquid supplied to the measurement chamber 80 during measurement may be, for example, water (fresh water or sea water) supplemented with a bubble agent. The bubble agent may be added, for example, at the same concentration as the liquid in the flotation machine.

The upper valve 110 may use a variety of valves depending on the application and may use automatic valves as required.

The air source 120 is the driving source when the bubble introduction valve 50 is driven by air. The opening/closing solenoid valve 130 is a solenoid valve for driving the opening/closing of the bubble introduction valve 50, and the opening/closing operation is controlled, for example, by the controller 140. When the opening/closing solenoid valve 130 is opened, air is supplied from the air source 120 to the bubble introduction valve 50 and the bubble introduction valve 50 opens or seals. The air source 120 may be a source of compressed air that supplies compressed air.

The controller 140 is a device for controlling the operation of the flotation machine 40 and the bubble measurement device and may be configured, for example, as a microcomputer. The controller 140 controls, for example, an operation of the opening/closing solenoid valve 130 as well as an image capturing operation of the image capturing device 100. The controller 140 may incorporate an image processer and process an image captured by the image capturing device 100. Although not illustrated in FIG. 1, the image processer may be provided separately from the controller 140, process images captured by the image capturing device 100, and transmit the images to the controller 140. Such system configurations may be of various configurations depending on the application.

Further, the control operation of the bubble introduction valve 50 is not mandatory, and the bubble introduction valve 50 may be configured to periodically perform the opening operation for a predetermined period of time, or it may be manually operated if the opening operation for a predetermined period of time is manually performed.

Next, a method of measuring bubbles using a bubble measurement device according to the present embodiment will be described.

Figure 3:
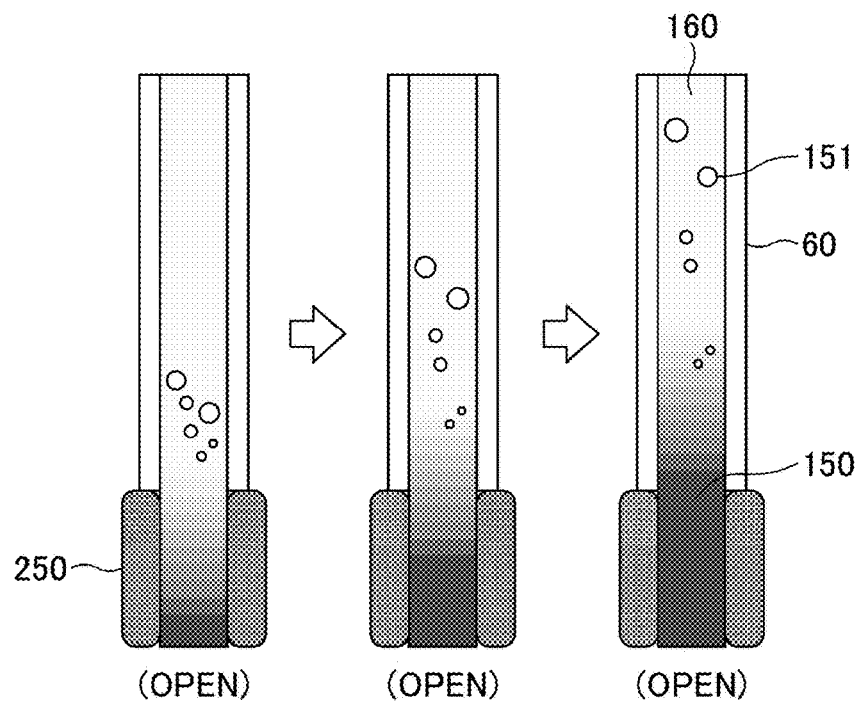
FIG. 3 is a view for explaining a conventional method of measuring bubbles.

First, a conventional method of measuring bubbles will be described with reference to FIG. 3. FIG. 3 is a diagram illustrating a conventional method of measuring bubbles.

As illustrated in FIG. 3, a conventional technique by which the bubble introduction valve 50 was kept constantly open to measure bubble 151 in a measurement chamber 280 was performed. In such a state, the ore slurry 150 will be mixed at the lower portion in the measurement chamber 280 and consequently liquid 160 in the measurement chamber 280 becomes clouded, and as a result, capturing images of bubbles is difficult.

Figure 4:
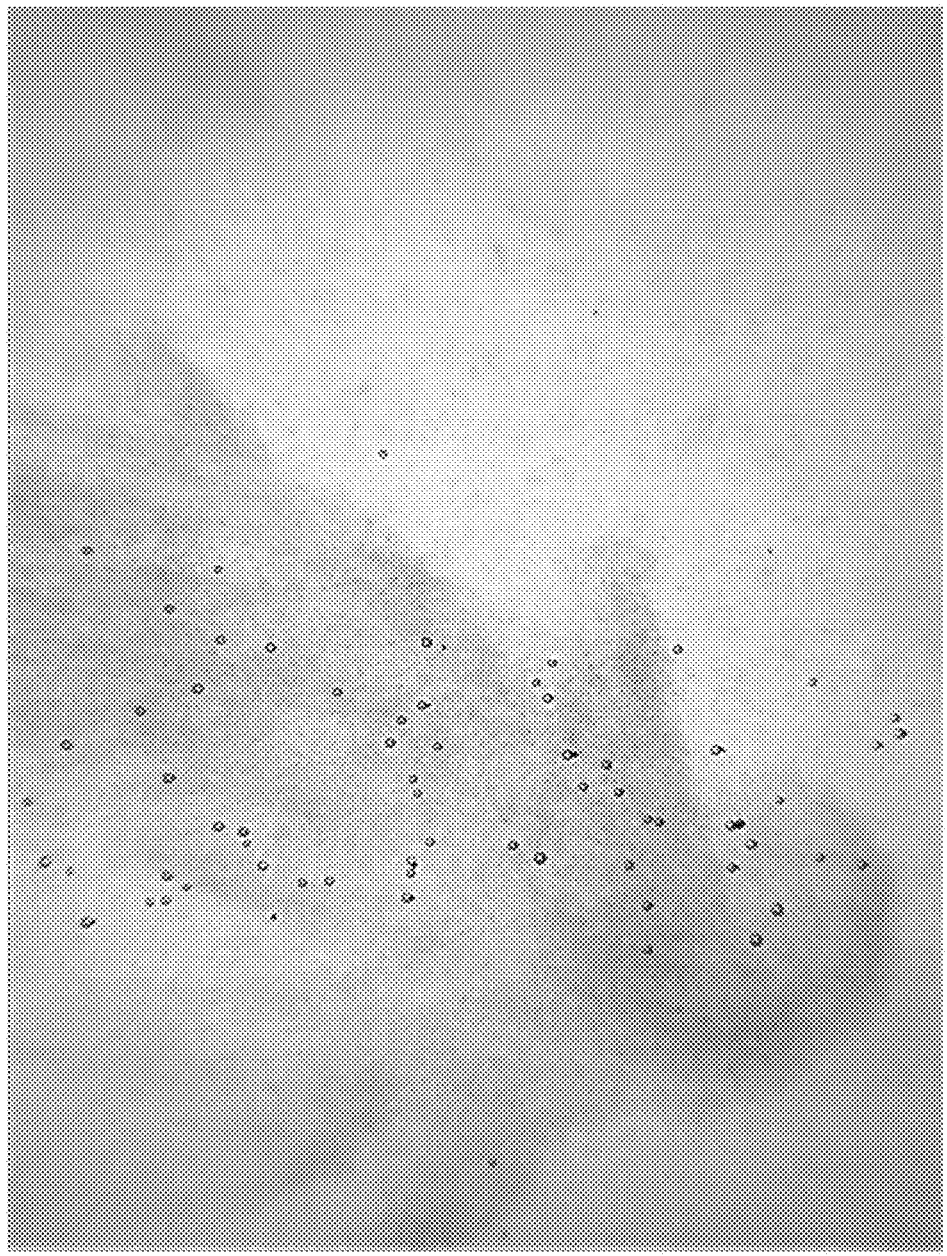
FIG. 4 is a view illustrating an image of turbidity that entered a device by applying a conventional method of measuring bubbles.

FIG. 4 is a diagram illustrating an image of clouded liquid according to a conventional method of measuring bubbles. In the image illustrated in FIG. 4, the image processing cannot distinguish between the bubble 151 and the turbidity caused by the ore slurry 150, thereby making it difficult to distinguish the bubble 151 from the ore slurry 151, and thus accurate measurement cannot be performed.

Figure 5:
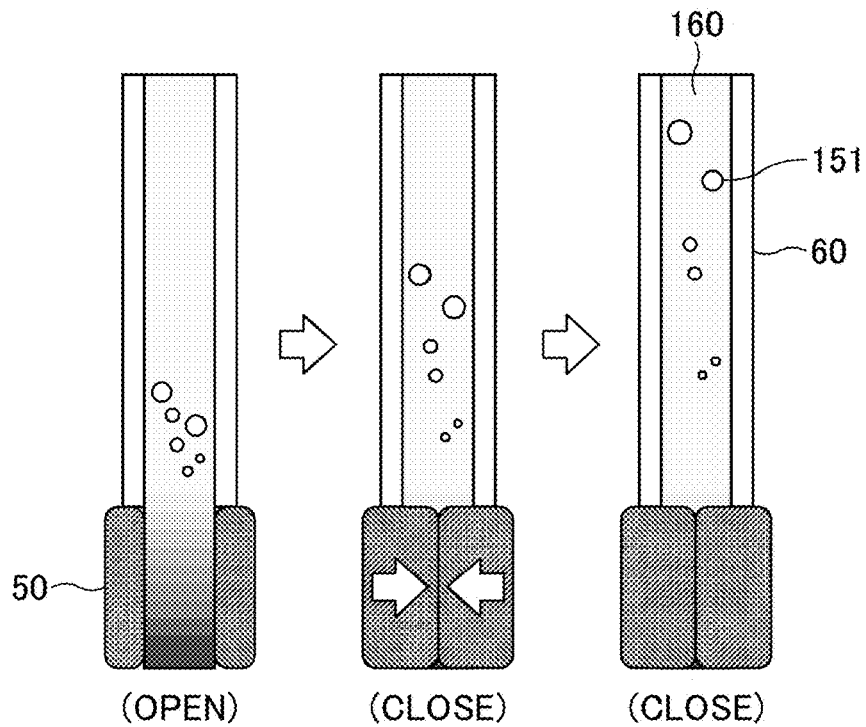
FIG. 5 is a view illustrating an example of a method of measuring bubbles of the present embodiment.

FIG. 5 is a diagram illustrating an example of a method of measuring bubbles in accordance with the present embodiment. As illustrated in FIG. 5, in the method of measuring bubbles in accordance with the present embodiment the bubble introduction valve 50 is opened and the bubble 151 is introduced into the measurement chamber 80. Thereafter the bubble introduction valve 50 is sealed to prevent the ore slurry 150 from entering the measurement chamber 80. This ensures that the clear liquid 160 is not turbid and that the bubble 151 can be accurately measured.

However, if simply the opening time of the bubble introduction valve 50 is limited, the opening time of the bubble introduction valve 50 is needed to be considerably shortened to obtain an image capable of sufficiently identify bubbles. Also, if the opening time of the bubble introduction valve 50 is too short, bubbles may not be sufficiently measured.

Accordingly, in the present embodiment, the appropriate opening time of the bubble introduction valve 50 is adjusted and set according to the shape of the introduction pipe 60, the properties of the liquid constituting the ore slurry 150, and the amount of air supplied from an air supply shaft 20. This allows proper measurement of the bubble 151 while increasing the opening time of the bubble introduction valve 50. The contents thereof will be described below.

First, the size (identification limit value) that is the identification limit for distinguishing between the bubble 151 and solid materials is present depending on the resolution of the image capturing device 100 to be used. The identification limit values are described below.

Figure 6:
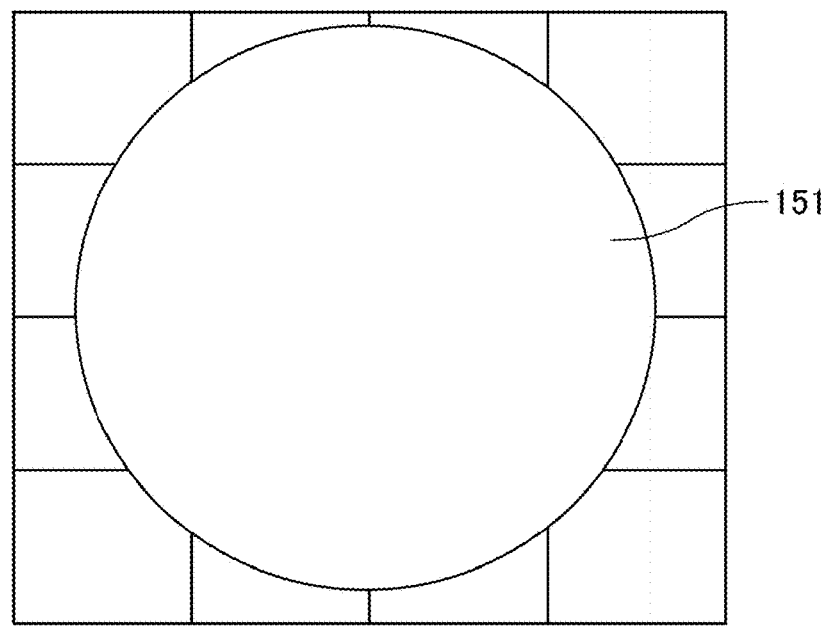
FIG. 6 is a view illustrating a bubble captured with a digital camera.

FIG. 6 is a diagram for explaining the resolution of the digital camera, and indicates a state in which a bubble 151 are captured. As illustrated in FIG. 4, the bubble 151 is often shaped to be circular or elliptical. To recognize the bubble 151, 4×4=16 pixels (image pixels) is required. If the 16 pixels are captured with a binary of 1 or 0, then the 16 pixels are 1 and the periphery is 0, and the bubble 151 is recognized as a rectangle as an image. That is, if the rectangular shape can be recognized, it can be determined that the bubble 151 has been imaged.

Figure 7:
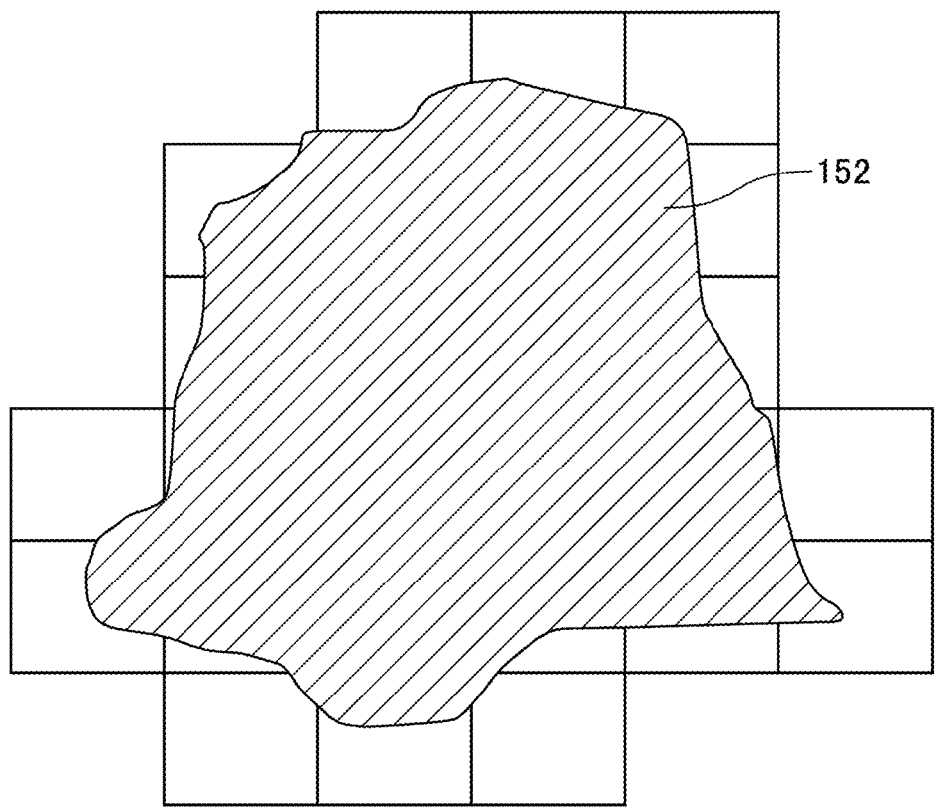
FIG. 7 is a view illustrating a mineral captured with the digital camera.

FIG. 7 is a diagram illustrating a mineral 152 captured by a digital camera. As illustrated in FIG. 7, the mineral 152 has an irregular shape with irregularities and corresponding pixels (regions recognized as 1) have irregularities. As noted above, the bubble 151 is recognized as a square or rectangular shape, but the mineral 152 is recognized as an irregular shape with irregularities, so that the shape of the captured image can be distinguished from the mineral 152 rather than the bubble 151.

Although the example in FIG. 6 in which the bubble 151 is recognized as square or rectangular, the larger bubble 151 can be recognized as a shape that approximates a circle or an ellipse (shaped with shaved or rounded corner) rather than a square or rectangular shape. Accordingly, the image processing shape of the bubble 151 also includes such a shape. All of these shapes are symmetrical and differ from irregular shapes with irregularities in the mineral 152. Therefore, some differences in the shape of the bubble 151 can be distinguished from the shape of the mineral 152 as long as they are not below the identification limit value.

When the shape recognition of the captured image is performed, the method is not limited to the above-described method. For example, the shape recognition may be performed by the circularity of the captured image. The circularity is a numerical value that is evaluated by the ratio of the area of the recognized image to the perimeter of the recognized image to represent the complexity of the shape being rendered on the image or the like, and decreases with the maximum value being 1 as the shape becomes more complicated. The circularity can be obtained by the following formula.

$$\text{Circularity} = 4\pi \times (\text{area}) \div (\text{perimeter})^2$$

For example, in the case of a perfect circle with a radius of 10, the calculation equation is "$4\pi \times (10 \times 10 \times \pi)/(10 \times 2 \times \pi)^2$", and the circularity is 1. That is, a perfect circle is judged as the least complex shape in degrees of circularity. Similarly, the square circularity is 0.785 and the equilateral triangle circularity is about 0.604, and the equilateral triangle is judged to be more complex than the square.

The circularity of images of irregular shapes with unevenness, such as the mineral 152, is below 0.785. Therefore, by setting the reference value of the circularity to 0.785, an image having the circularity of 0.785 or more can be recognized as a bubble while recognizing an image having the circularity of less than 0.785 as a mineral.

Figure 8A:
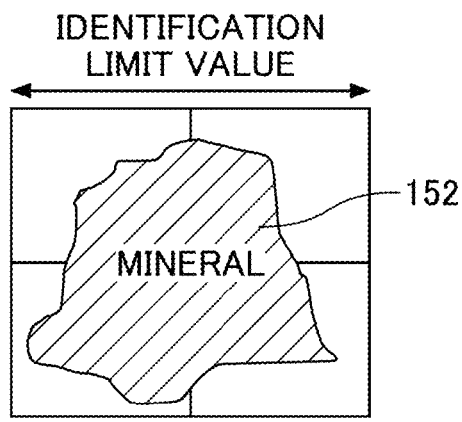
FIG. 8A is a view for explaining an identification limit value of the digital camera.
Figure 8B:
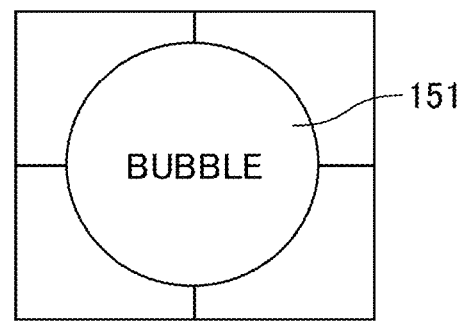
FIG. 8B is a view for explaining an identification limit value of the digital camera.

FIGS. 8A and 8B are diagrams for explaining an identification limit value of a digital camera. FIG. 8A illustrates a state in which an image of a fine particle of a mineral 152 is captured, and FIG. 8B illustrates a state in which an image of a fine bubble 151 is captured.

As illustrated in FIGS. 8A and 8B, when the mineral 152 is fine, the mineral is recognized in the form of a square or rectangular shape of 2×2=4 pixels and is recognized in the form of a square or rectangular shape in the similar manner as the bubble 151 illustrated in FIG. 8B. Accordingly, the digital camera is incapable of recognizing the mineral 152 as distinct from the bubble 151. That is, in the case of a digital camera, the length corresponding to two pixels becomes the one-sided identification limit.

The same shall apply when the shape is recognized by the circularity. In situations where the mineral 152 and the bubble 151 are imaged in the same shape, the geometry of the mineral 152 cannot be distinguished from the bubble 151 because there is no difference in the circularity of the two.

Thus, the image capturing device 100 has an inherent identification limit value, and the mineral 152 having a particulate level smaller than the identification limit value is indistinguishable from the bubble 151.

Accordingly, it is necessary to suppress the flow of minerals 152, which are solid materials (fine particles) smaller than this identification limit value, into the measurement chamber 80.

However, it is impossible and impractical to completely control particulate inflow. When the image of the bubble 151 is captured with the image capturing device 100, it is sufficient that the inflow of particles is suppressed so that the bubble 151 and the solid materials can be distinguished. Hereinafter, the mineral 152 is collectively referred to as solid materials in order to include solid materials present in the ore slurry 150 other than the mineral 152.

The introduction time of the bubbles 151, enabling suppression of the inflow of fine particles to a distinguishable extent between the bubbles 151 and the solid materials, can be investigated in advance according to the shape of the introduction pipe 60, the properties of the liquid constituting the ore slurry 150, and the supply amount of air supplied to the liquid to form the bubbles 151 (for example, by using a tester). When the bubbles are measured by adjusting the opening time of the bubbles introducing valve 50 according to the introduction time determined by this investigation, the inflow of solid materials (fine particles) smaller than the identification limit value can be suppressed into the measurement chamber 80. This makes it possible to measure bubbles accurately.

The specific method for investigating the bubble introduction time is as follows.

First, at a predetermined time, the bubble introduction valve 50 is opened to collect the bubbles 151. At this time, turbidity will also be collected. Here, the opening time of the bubble introduction valve 50 is determined by the shape of the introduction pipe 60, the property of the ore slurry 150, and the amount of air supplied into the ore slurry 150.

With respect to the shape of the introduction pipe 60, the length in the longitudinal direction and the inner size of the introduction pipe 60 affect the opening time of the bubble introduction valve 50. That is, the longer the length of the introduction pipe 60, the more difficult it is for the solid particles contained in the ore slurry 150 to reach the measurement chamber 80. Therefore, the longer the length of the introduction pipe 60, the longer the opening time of the bubble introduction valve 50 can be set.

Further, if the inner size of the introduction pipe 60 is large, the ore slurry 150 and solid materials contained in the ore slurry 150 can easily pass through the introduction pipe 60, and consequently it is necessary to set the opening time of the bubble introduction valve 50 to be short. On the other hand, if the inner size of the introduction pipe 60 is set to be small, the ore slurry 150 and solid materials contained in the ore slurry 150 cannot easily pass through the introduction pipe 60, so that the opening time of the bubble introduction valve 50 can be set to be long.

Therefore, if the length of the introduction pipe 60 is set to be long and the inner size of the introduction pipe 60 is set to be small, the opening time of the bubble introduction valve 50 can be set to be long.

For example, when the inner size of the introduction pipe 60 is 50 mm or less, it has been confirmed that the opening time of the introduction opening valve 50 can be increased by setting the length of the introduction pipe 60 to 7 times or more of the inner size of the introduction pipe 60. Specific numerical values are described later. The inner size of the introduction pipe 60 is preferably 5 mm or more. This makes it possible to measure the largest 4 mm bubble among the bubbles to be measured.

Regarding the property of the ore slurry 150, the particle size of the ore contained in the ore slurry 150 and the slurry concentration affect the opening time of the bubble introduction valve 50. The particle size of the ore is determined by the maximum and average particle sizes. The maximum particle size is literally the maximum size of the ore particles contained in the ore slurry 150. The average particle size is the average size of the ore particles contained in the ore slurry 150 and is indicated by the median size (D50) in which the larger and smaller sides are equal when the particle size distribution of the ore particles is divided into two.

The larger the ore particle size, the longer the opening time of the bubble introduction valve 50 can be set. However, in the case of the ore slurry 150 having a particularly large ore particle size, the turbidity does not occur during the bubble counting in the first place and the invention need not be applied. It has been confirmed that the effective ore particle size obtained by applying the present invention is 300 μm or less in maximum particle size and less than 100 μm in average particle size (median size D50).

Further, the slurry concentration is preferably less than the predetermined value because, if the concentration is too high, the proportion of ore particles increases and turbidity is likely to occur in the measurement chamber 80. For example, it has been confirmed that when the slurry concentration is set to be less than 50 wt %, the opening time of the bubble introduction valve 50 can be set to be longer. When the slurry concentration is set to 50 wt % or more, ore particles of the ore slurry 150 flow into the introduction pipe 60, easily entering the measurement chamber 80, and consequently turbidity tends to be generated. Therefore, the slurry concentration is preferably adjusted to be less than 50 wt %.

For the amount of air supplied into the ore slurry 150, the smaller the supply amount, the longer the opening time of the bubble introduction valve 50 can be set. As the amount of air supplied increases, the bubbles 151 introduced from the bubble introduction valve 50 tend to generate a flow and allow ore particles to be easily delivered into the introduction pipe 60. Accordingly, the amount of air supplied to the ore slurry 150 is preferably smaller from the viewpoint of setting the opening time of the bubble introduction valve 50 longer.

Taking these parameters into account, the opening time of the bubble introduction valve 50 is adjusted. Among these parameters, the length of the introduction pipe 60 and the amount of air supplied to the ore slurry 150 are the factors that most influence the opening time of the bubble introduction valve 50.

In particular, when the introduction pipe 60 is set to a certain length or longer, for example, 20 times or more the inner size of the introduction pipe 60, or 500 mm or more numerically, even though the air supply amount into the ore slurry 150 is high, it is often possible to distinguish the bubble 151 from the solid materials and image the bubble 151.

The amount of air supplied into the ore slurry 150 has been found to be the second most influential factor after the length of the introduction pipe 60, as will be discussed later.

During the investigation phase, the opening time of the bubble introduction valve 50 is tentatively set, while setting the parameters described above. Then, the bubble introduction valve 50 is opened to introduce the bubble 151 into the introduction pipe 60 at a set opening time. At that time, the ore slurry 150 is also introduced into the introduction pipe, and some turbidity is generated.

Then, the ore slurry 150 containing the turbidity in the measurement chamber 80 and the introduction pipe 60 is sampled to determine the particle size distribution of the solid materials contained in the ore slurry 150.

If a peak in the particle size distribution of the solid materials contained in the ore slurry 150 is observed in the particle size range smaller than the identification limit value of the image capturing device 100, it is determined as unacceptable (NG). On the other hand, when no peaks in the particle size distribution of the solid materials are observed in the particle size range smaller than the identification limit value of the image capturing device 100, it is determined as OK. The identification limit value of the image capturing device 100 is needed to be confirmed in advance.

When determined as OK in the above criteria, the opening time of the first set bubble introduction valve 50 is adopted as the introduction time of the bubbles 151 and solid materials that can control the inflow of particulates to a discernible degree.

Such an investigation is carried out by setting the opening time of the various bubble introduction valves 50 while varying the parameters described above to determine if peaks in the particle size distribution of the solid materials contained in the ore slurry 150 are observed in the particle size range less than the identification limit value of the image capturing device, and the opening time of the bubble introduction valve 50 is adjusted.

At that time, while considering qualitative characteristics such as allowing the opening time of the bubble introduction valve 50 to be longer as the introduction pipe 60 is longer, allowing the opening time of the bubble introduction valve 50 to be longer as the amount of air supplied to the ore slurry 150 is smaller, the opening time of the bubble introduction valve 50 can be longer, the opening time of the bubble introduction valve 50 is set while predicting, determined, and adjusted. These are then changed as the properties of the ore slurry 150 change, so each of them is set in accordance with the properties of the ore slurry 150.

This allows conditions to be set for the various ore slurries 150 to reliably measure bubbles 151.

As described above, according to the bubble measurement device and the method of measuring bubbles according to the present embodiment, the opening time of the appropriate bubble introduction valve 50 corresponding to the various ore slurries 150 can be set, the bubbles 151 can be separately recognized from the solid materials, and the bubble data such as the bubble size and the number of bubbles density can be accurately and reliably measured. In the above-described embodiment, the time of introducing the bubbles 151 is investigated and set according to the shape of the introduction pipe 60, the properties of the liquid constituting the ore slurry 150, and the supply amount of air supplied to the liquid to form the bubbles 151. However, the above-described embodiment is not limited thereto. For example, additional investigation items other than the above may be set as investigation items such as the distribution (flow velocity distribution) of the flow state of the slurry 150.

EXAMPLES

Next, an embodiment in which the above-described method of measuring bubbles is performed will be described. In the embodiment, the first embodiment and the corresponding components are given the same reference numerals, and the description thereof is omitted.

FIG. 9 is a diagram illustrating the results of Examples and Comparative Examples. In FIG. 9, the "length of the introduction pipe" and the "size of the introduction pipe" are indicated as parameter items. In addition, "amount of air supplied is given as a parameter item, and "ore particle size in the slurry" and "slurry concentration" are given as parameter items indicating the properties of the ore slurry. The identification limit of the image capturing device 100 is 30 µm.

In the present examples, the ore slurry 150 fulfilling the conditions of having the maximum particle size of 300 µm or less and the median size (D50) of less than 100 µm was used for the ore slurry 150. In addition, the ore slurry 150 with a slurry concentration of less than 50 wt % was used.

In addition, the size of the bubble 151 was set to be 20 µm or more.

In Example 1 and Comparative Example 1, the length of the introduction pipe 60 was set to be 200 mm or more and 500 mm or less, and the amount of air supplied to the 1 L (liter) of the ore slurry 150 was set to be more than 0.6 L/min and 4.0 L/min or less. The opening time of the bubble opening valve 50 was varied from a few seconds to a few tens of seconds, and the bubble 151 was introduced into the introduction pipe 60 at a set opening time. Then, the ore slurry 150 containing the turbidity in the measurement chamber 80 and the introduction pipe 60 was sampled to determine the particle size distribution of the solid materials contained in the ore slurry 150.

The relationship between the length and the inner size of the introduction pipe 60 was set so that the length of the introduction pipe 60 was 7 times or more and less than 20 times the inner size of the introduction pipe 60.

Thus, when the opening time of the bubble introduction valve 50 was 10 seconds or less, the peak of the particle size distribution was greater than 30 µm, and the bubbles 151 were indeed identified without being affected by turbidity (Example 1).

On the other hand, when the opening time of the bubble introduction valve 50 exceeds 10 seconds, the peak of the particle size distribution became smaller than 30 µm, and the bubble 151 was also affected by turbidity, making it difficult to distinguish and recognize the bubble 151 from turbidity (Comparative example 1).

In Example 2 and Comparative Example 2 of FIG. 9, the length of the introduction pipe 60 was set to be 200 mm or more and 500 mm or less, and the amount of air supplied to the 1 L of the ore slurry 150 was set to be more than 0.2 L/min and 0.6 L/min or less. In this case, since the amount of air supplied was smaller than that of the case of Example 1 and Comparative Example 1, the length of the bubble introduction valve 50 was set to be longer, the opening time of the bubble introduction valve 50 was set to be between approximately 35 seconds and approximately 45 seconds, and the bubble 151 was introduced into the introduction pipe 60 at the set opening time. Then, the ore slurry 150 containing the turbidity in the measurement chamber 80 and the introduction pipe 60 was sampled to determine the particle size distribution of the solid materials contained in the ore slurry 150.

Then, when the opening time of the bubble introduction valve 50 was 40 seconds or less, the peak of the particle size distribution was greater than 30 μm, and the bubbles 151 could be identified without being affected by turbidity (Example 2).

On the other hand, when the opening time of the bubble introduction valve 50 exceeds 40 seconds, the peak of the particle size distribution became smaller than 30 μm, and the bubble 151 was also affected by turbidity, making it difficult to distinguish and recognize the bubble 151 from turbidity (Comparative example 2).

In Example 3 and Comparative Example 3, the length of the introduction pipe 60 was lengthened to 500 mm or more, and the amount of air supplied to the 1 L of the ore slurry 150 was set to be more than 0.6 L/min and 4.0 L/min or less in the same manner as in Example 1 and Comparative Example 1. The amount of air suppled is increased compared to that of Example 2 and Comparative Examples, but the length of the most influential introduction pipe 60 is set to be 500 mm or more, and the length of the introduction pipe 60 is set to be 20 times the inner size or more. Therefore, the opening time of the bubble introduction valve 50 is set to be longer than 40 seconds and varied within the range of 50 seconds or more.

As a result, when the opening time of the bubble introduction valve 50 was 60 seconds or less, the peak of the particle size distribution was greater than 30 μm, and the bubbles 151 were identified without being affected by turbidity (Example 3).

On the other hand, when the opening time of the bubble introduction valve 50 exceeds 60 seconds, the peak of the particle size distribution becomes smaller than 30 μm, and the bubbles 151 are also affected by turbidity, making it difficult to distinguish and recognize the bubbles 151 from turbidity (Comparative example 3).

From these results, it can be confirmed that the "length of the introduction pipe" and the "amount of air suppled" have a large influence on each element (parameter) on the turbidity in the measurement chamber 80.

Also, from the results of Examples 1 to 3 and Comparative Examples 1 to 3, the introduction pipe 60 was advantageous the longer the length. The shorter the introduction pipe 60, the more susceptible it is to cloudiness even with a shorter opening time of the bubble introduction valve 50. When the length of the introduction pipe 60 exceeds 500 mm or becomes 20 times the inner size of the introduction pipe 60, the turbidity gradually becomes less and less, and the effect of turbidity becomes negligible.

In the present embodiment, a bubble 151 having a size of 20 μm or larger was used because a bubble size of the bubble 151 of less than 20 μm caused an extremely slow flotation speed (counteracting the turbidity rate). The present invention is suitably provided to at least such Agitair-type and Denver-type floatation machines. However, the present invention can also be applied when the size of the bubble 151 is less than 20 μm. For example, if the bubble 151 is an extremely slow flotation speed with a rate of less than 20 μm, the bubble introduction valve 50 may be kept open at all times. Thus, the present invention is applicable to all bubbles having a bubble size of less than 20 μm, as well as bubbles having a bubble size of 20 μm or greater.

In addition, ore slurry 150 having ore particle size of 300 μm or less in maximum particle size and 100 μm or less in average particle size was targeted. However, it is effective to use the present invention for ore slurry 150 that satisfies this condition. The finer the particles, the more turbid the flow. However, the present invention can also be applied to ore slurry 150 with fewer fine particles. For example, if the ore slurry 150 is an ore slurry with few fine particles and no turbidity, the bubble introduction valve 50 can be kept open at all times. Thus, the present invention is applicable to all ore slurries including ore slurry 150 with fewer fine particles as well as ore slurry 150 with fewer fine particles.

Further, although the concentration of the ore slurry is set to be less than 50 wt %, it is also considered that the present invention cannot fully address the problem, since the turbidity flowing into the introduction pipe 60 increases when the concentration is 50 wt % or more. For example, if the concentration of the ore slurry is 50 wt % or more, the opening time should be set to be shorter than the opening time of the bubble introduction valve 50 set in FIG. 6.

In addition, it was confirmed that the more the amount of air suppled is, the less favorable it is. As noted above, when introducing air into the introduction pipe 60, flow is likely to occur.

Thus, considering the shape of the introduction pipe 60, the amount of air supplied into the liquid, and the properties of the liquid, the opening time of the bubble introduction valve 50 can be set so that the bubbles 151 can be identified by capturing the image by the image capturing device 100, and the peak of the particle size distribution of the solid materials in the collected liquid is adjusted so that the peak of the particle size distribution of the collected liquid is not less than the identification limit value of the image capturing device 100 to ensure that the bubbles 151 are measured.

Measurement of the bubbles 151 can be performed in various ways depending on the application, such as the size of the bubble and the density of the bubble 151.

Figure 10:
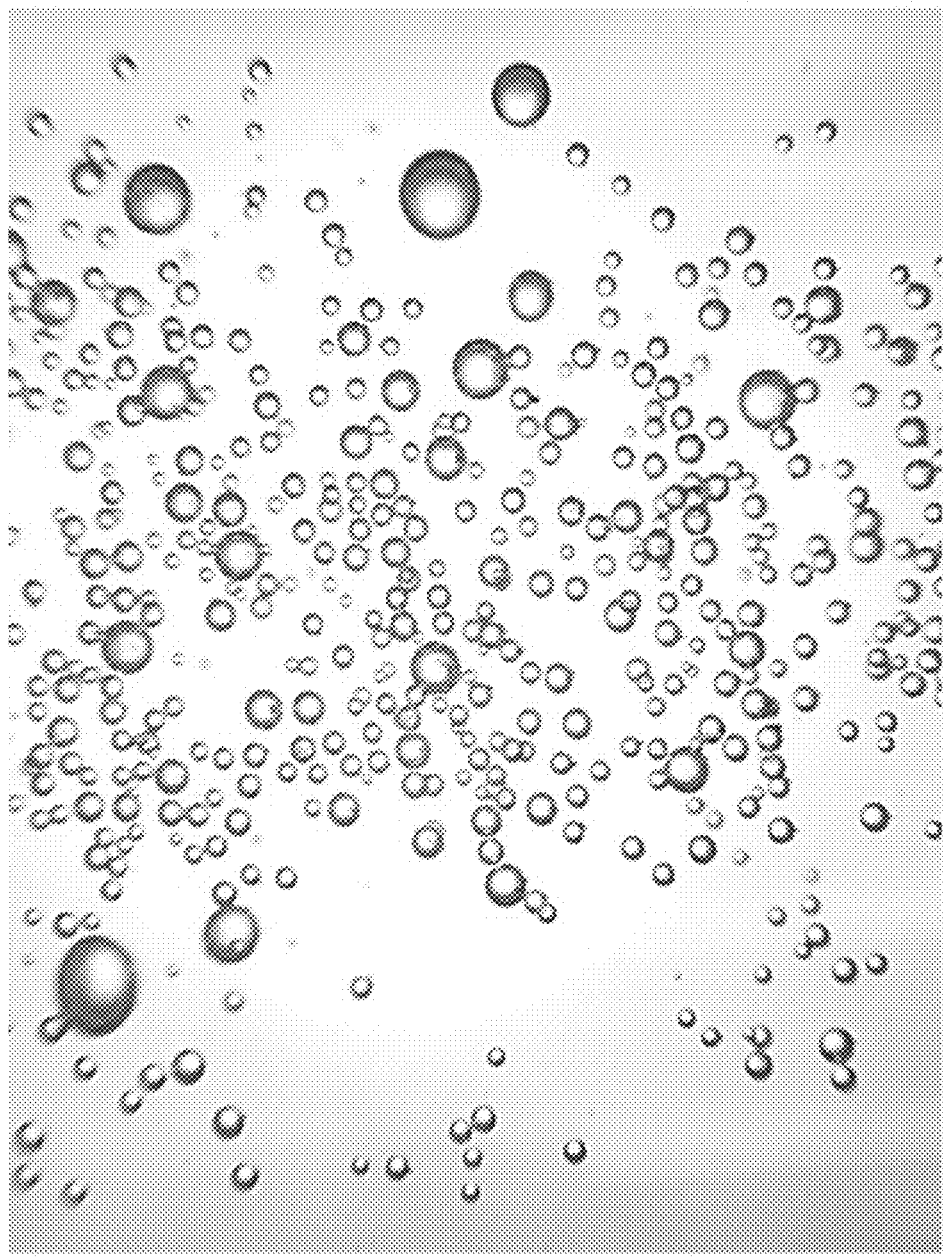
FIG. 10 is a view illustrating an image of bubbles measured by the method of measuring bubbles using the bubble measurement device of the present embodiment.

FIG. 10 is a diagram illustrating an image of bubbles measured by a method of measuring bubbles using a bubble measurement device according to the present embodiment. As described above, according to the method of measuring bubbles and the bubble measurement device in accordance with the present embodiment, bubbles are not mixed with fine particles, and bubbles can be measured reliably and accurately.

Second Embodiment (Basic Configuration of Bubble Size Measurement Device and Floatation Machine)

Figure 11:
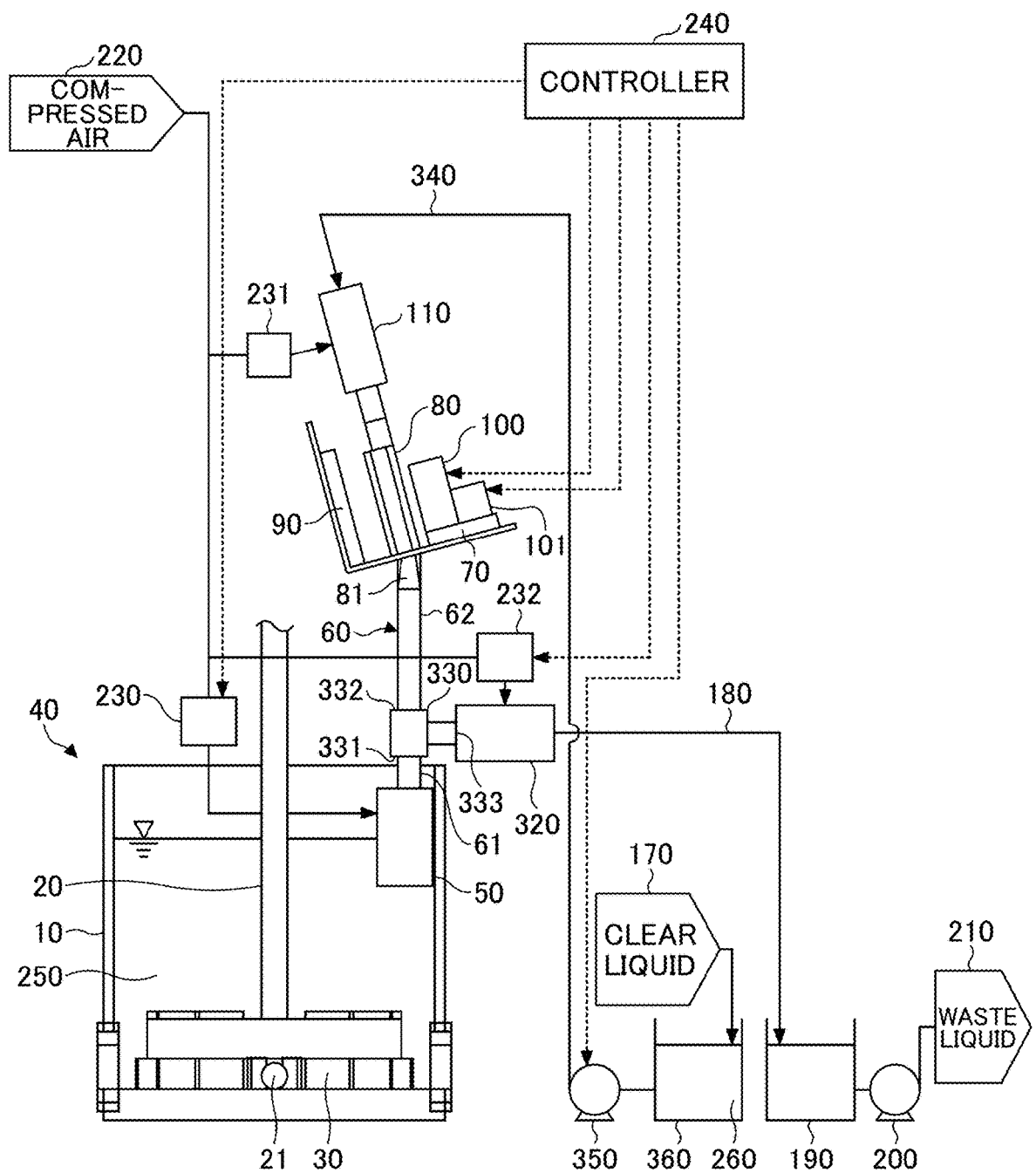
FIG. 11 is a schematic diagram illustrating the structure of a bubble measurement device and a flotation machine to which a bubble measurement device is applied in an embodiment of the present invention.

FIG. 11 is a schematic diagram illustrating the configuration of the bubble measurement device of the second embodiment of the present invention and the configuration of the flotation machine to which the bubble measurement device is applied. The bubble measurement device according to the second embodiment of the present invention includes a bubble introduction valve 50, an introduction pipe 60, a frame 70, a measurement chamber 80, a light projection device 90, an image capturing device 100, a first opening/closing valve 110, a second opening/closing valve 320, and a branch pipe 330. Alternatively, an observation solution introduction pipe 340, a pump 350, an observation solution storage tank 360, an observation solution source 170, an observation solution drain pipe 180, a waste liquid tank 190, a drain pump 200, a drain facility 210, a compressed air source 220, opening/closing solenoid valves 230, 231, 232, and a controller 240 may be provided as desired. The same reference numerals may be provided to the same components as those of the first embodiment.

The flotation machine 40 to which the bubble measurement device of the present embodiment is applied includes a flotation tank 10, an air supply shaft 20, and an agitator blade 30. Also, as a relevant component of the flotation machine 40 and the bubble measurement device, liquid 250 containing solid particles is stored in the flotation tank 10.

Various commonly used flotation machines may be used as the flotation machine 40 of the present embodiment, for example, an Agitair-type flotation machine or a Denver-type flotation machine.

The flotation tank 10 is a liquid storage device for storing the liquid 250 containing pulverized materials to be oredressed. The liquid 250 includes, for example, ores. Air is supplied into the liquid 250 and bubbles are used to deposit ore to perform floatation and collect useful metals.

The air supply shaft 20 is an air supply device for supplying air (air) from the lower end thereof. As described above, air is supplied into the liquid 250 to generate bubbles for deposition of ores. For example, the lower end of the air supply shaft 20 is disposed near the bottom surface of the floatation tank 10 to generate bubbles near the bottom surface of the floatation tank 10.

The agitator blade 30 is a bubble micronizing device for reducing the size of bubbles generated by air supplied from the lower end of the air supply shaft 20. The bubbles generated at the lower end of the air supply shaft 20, that is, the center of the agitator blade 30, collide with the agitator blade 30 by rotation of the agitator blade 30 when the bubbles are discharged from the agitator blade 30, thereby reducing the size of bubbles.

The sizes, density, and the like of bubbles affect flotation performance. Therefore, it is important to measure and control bubbles to improve flotation performance. A bubble measurement device of the present embodiment is used to measure the bubble size, bubble density, and the like.

In the present embodiment, the basic configuration of the bubble measurement device includes a measurement chamber 80, which will be described later, and a first opening/closing valve 110 for opening and closing the flow of the observation solution 260 to the measurement chamber 80 is provided above the measurement chamber 80, and a second opening/closing valve 320 having functions equivalent to the upper first opening/closing valve 110 is provided below the measurement chamber 80. Further, below the measurement chamber 80 is provided an introduction pipe 60 for introducing bubbles and a bubble introduction valve 50 for introducing and blocking of the bubbles within the introduction pipe 60.

As a basic configuration, a bubble size measurement device preferably includes an image capturing device 100 capable of viewing the condition of bubbles of the measuring portion 83a in the measurement chamber 80 and a light projection device 90. Further, the details of the light projection device 90 and the image capturing device 100 will be described below.

A pump 350 is connected to the first opening/closing valve 110 through the observation solution introduction pipe 340, and an observation solution storage tank 360 is connected to the primary side of the solution feed pump 350, so that the pump 350 can deliver the observation solution 260 in the observation solution storage tank to the first opening/closing valve 110. The observation solution storage tank 360 is configured to supply the observation solution 260 from the observation solution source 170. Further, near the lower end of the introduction pipe 60, a branch pipe 330 is provided, and a second opening/closing valve 320 is connected to the introduction pipe 60. The drain pipe 180 is connected to the second opening/closing valve 320, and a waste liquid tank 190 is provided at the end of the drain pipe 180, so that the drain liquid from the second opening/closing valve 320 can be received by the waste liquid tank 190. A drain pump 200 is connected to the waste liquid tank 190 and is configured to drain the waste liquid stored in the waste liquid tank 190 to the drain facility 210.

Additionally, if desired, when the first opening/closing valve 110, the second opening/closing valve 320, and the bubble introduction valve 50 are air driven, the air source 220 and the controller 240 that controls opening and closing of the opening/closing solenoid valves 230, 231, and 232, may be provided. The opening/closing solenoid valve 230 is a driving device for driving the bubble introduction valve 50 to opening/closing, and the opening/closing solenoid valve 231 is a driving device for driving the first opening/closing valve 110 to opening/closing. The opening/closing solenoid valve 232 is a driving device for driving the second opening/closing valve 320.

The measurement of bubbles is specifically performed as follows.

First, bubbles are introduced from the bubble introduction valve 50 and the introduced bubbles are introduced into the measurement chamber 80 via the introduction pipe 60. The light projection device 90 emits light the measurement chamber 80, and the image capturing device 100 captures the bubbles in the measurement chamber 80, acquires the necessary information such as the bubble size, the density of the bubbles, and the like from the captured images, and measures the values thereof. In bubble counting, the measurement chamber 80 is initially filled with a clear observation solution 260, but the clear observation solution 260 becomes turbid in the measurement chamber 80 because the mineral slurry is also introduced upon introduction of the bubbles. A high degree of turbidity makes it difficult to distinguish bubbles from the ores (solid materials) and to measure bubbles accurately.

If such a condition occurs, the observation solution 260 filled in the measurement chamber 80 must be replaced to make the bubbles observable in a clear condition in order to continue the measurement of the bubbles. In such a case, very time-consuming and labor-intensive work of pulling up the bubble counting device, draining the cloudy observation solution 260 from the bubble introduction valve 50 or the first opening/closing valve 110, newly introducing the observation solution 260 from the first open valve 110 into the measurement chamber 80, and reinstalling the bubble counting device by placing the bubble counting device in the flotation machine 40 again.

In the bubble measurement device and the method of measuring bubbles of the present embodiment, a second opening/closing valve 320 is provided to form a channel through which the observation solution 260 can be flowed above and below the measurement chamber 80, allowing the observation solution 260 to be replaced without pulling the bubble measurement device from the flotation machine 40.

The bubble size measurement device of the present embodiment closes the first opening/closing valve 110 and the second opening/closing valve 320 when capturing the image of the actual bubbles and opens the bubble introduction valve 50 to introduce bubbles into the introduction pipe 60 for capturing the image of the bubbles. Meanwhile, the bubble size measurement device of the present embodiment closes the bubble introduction valve 50 before such image-capturing is performed and opens the first opening/closing valve 110 and the second opening/closing valve 320 together to supply the clear observation solution 260 to the measurement chamber 80 from the side of the first opening/closing valve 110 or from the side of the second opening/closing valve 320, while draining and replacing the observation solution 260, which filled the measurement chamber 80 before the supply of the observation solution 260, from the opening/closing valve on a side different from the supplied side. This ensures the transparency of the observation solution 260 that fills the measurement chamber 80. That is, not only when the liquid containing the bubbles to be measured is liquid without solid particles, such as fresh water or seawater, but also when the liquid contains solid particles, a clear image can be captured. In addition, even when the liquid contains microscopic bubbles, the bubbles adhering to the bubble size measurement device can be washed out before capturing images. Therefore, the size and quantity of the generated bubbles can be properly determined.

Further, since the bubble size measurement device of the present embodiment can replace the observation solution 260 in the measurement chamber 80 by only opening and closing the first and second opening/closing valves 110 and 320, each time the observation solution 260 in the measurement chamber 80 is replaced, the bubble size measurement device does not need to be pulled up from the flotation tank 10 in which the liquid 250 containing the bubbles to be measured is stored, and thus the above-described image-capturing can be efficiently performed.

Hereinafter, the components of the bubble measurement device of the present embodiment will be described in detail.

(Measurement Chamber)

Refer to FIGS. 2A and 2B. FIGS. 2A and 2B are enlarged views of the measurement chamber 80. FIG. 2A is a side view of the measurement chamber 80, and FIG. 2B is a front view of the measurement chamber 80.

In the present embodiment, the measurement chamber 80 is composed of a plurality of clear members. In the present embodiment, the material of these members is vinyl chloride. As the material of the member, a member having a high light transmittance may be suitably used so that the light emitted from the light projection device 90 can be transmitted through the measurement chamber 80 and measured by the image capturing device 100. In the visible light range from 400 nm to 700 mm, the light transmittance of the member is preferably 80% or more and more preferably 90% or more.

Glass, an acrylic, polyethylene terephthalate (PET), a polycarbonate, or the like may be used as the member satisfying the above-described optical properties in addition to vinyl chloride.

Vinyl chloride is inexpensive, easy to process, and transparency. Therefore, vinyl chloride can be suitably used for a member of the measurement chamber 80. In addition, acrylic is also clearer than vinyl chloride, less scratchy, and is unlikely to decrease in transparency, and can be suitably used for installation in places where replacement is difficult.

The measurement chamber 80 is provided with a main member 82 and a first cover member 83 and a second cover member 84 so as to sandwich the main member 82. The contour of the main member 82 is in the form of a thick square plate, that is, a flat square pillar. The main member 82 is provided with a measuring hole 82a having a relatively large size. The axial direction of the measuring hole 82a coincides with the thickness direction (this direction may be referred to as the thickness direction of the main member 82) of the thinnest square-pillar shape of the main member 82. When the main member 82 is sandwiched between the first cover member 83 and the second cover member 84 so as to block the measuring hole 82a, the portion of the measuring hole 82a becomes a space closed in the axial direction of the measuring hole 82a.

Of the spaces composed of the main member 82, the first cover member 83, and the second cover member 84, the right side of the first cover member 83 is called a transparent slope, and the part of the transparent slope in which the measuring hole 82a is positioned is called the measuring portion 83a.

The measurement chamber 80 further includes an introduction pipe connector 81 provided beneath the main member 82 and a delivery pipe 85 provided above the main member 82 to which the introduction pipe connector 81 connects the introduction pipe 60. Here, the introduction pipe connector 81 has a through hole, and both the introduction pipe 60 and the delivery pipe 85 are tubular structures, so that the measurement chamber 80 communicates vertically through these members. Such communication allows for retaining the liquid 250 in the measurement chamber 80 and introduces bubbles in the liquid 250 from the introduction pipe 60.

The introduction pipe 60, which is connected to the introduction pipe connector 81, is positioned so that the axis of the inner surface of the pipe is vertical. The upper surface of the introduction pipe connector 81 connected to the introduction pipe 60 is inclined by an inclined angle θ from the horizontal surface. As a result of this tilting of the upper surface of the introduction pipe connector 81, the transparent slope including the measuring portion 83a is inclined by an inclination angle θ from the vertical. That is, the normal of the transparent slope becomes downward, and the transparent slope is downwardly inclined. The inclined angle θ is determined so that the transparent slope is positioned at the position from which bubbles rise from the introduction port. In the present embodiment, the inclined angle θ is 15 degrees, but may be set to various angles depending on the application. In addition, by tilting the measuring portion 83a, it is possible to capture the image of the bubbles while focusing on all the bubbles.

Bubbles that have risen in the liquid due to the inclined angle θ of the transparent slope are in contact with the transparent slope including the measuring portion 83a, and bubbles greater than or equal to a certain size rise along this transparent slope. This rising of bubbles prevents overlapping of bubbles. Therefore, the size and quantity of bubbles can be accurately measured. At this time, there is little movement of the liquid containing bubbles.

The size L1 of the measuring hole 82a of the main member 82 constituting the bubble measurement device of the present embodiment is larger than the size of the inner surface of the introduction pipe 60. Here, the size L1 of the measuring hole 82a is the length in the right and left directions of the measuring portion 83a when the transparent slope is viewed from the front.

The main member 82 is provided with a measuring hole 82a as described above, and an enlarged communication portion is provided for communicating the measuring hole 82a with the introduction pipe 60. The enlarged connection is groove shaped. The length of the groove of the enlarged communication portion from the right and left directions to the measuring portion 83a is lengthened from the lower side to the upper side in a constant ratio. The depth of the groove shape of the enlarged communication portion has a depth of ⅓ of the length of the thickness direction of the main member 82.

(Light Projection Device and Image Capturing Device)

The light projection device 90 emits light of a predetermined type from one side of the measurement chamber 80 to the measuring portion 83a. This facilitates image capturing within the measurement chamber 80. As the illumination device, for example, surface illumination such as a white LED is preferably used.

The image capturing device 100 is preferably a digital camera or the like capable of capturing at least either a still image or a movie. The size and quantity of bubbles captured by the image capturing device 100 are preferably analyzed by a software that performs image processing. The image capturing device 100 may use a variety of image capturing device as long as the image of the bubbles can be appropriately captured. For example, the image capturing device 100 may use a continuous image capturing device having an image-capturing speed of 3.3 fps.

(Frame)

The frame 70 is a support member for supporting the measurement chamber 80, the light projection device 90, and the image capturing device 100.

(Introduction Pipe)

In the present embodiment, the introduction pipe 60 is a pipe having a cylindrical cross-section in which both ends are opened, and is divided longitudinally, and a branch pipe 330 is inserted into the divided portion. Here, the branch pipe 330 is a branch-shaped pipe having at least one pair of directly opposite connecting end pairs. One of the introduction pipes 61, which is the division of the introduction pipe 60, is connected to one end of this directly opposite connection pair, and the other introduction pipe 62, which is the other division of the introduction pipe, is connected to the other end of the connection pair. The end of the introduction pipe 61 at the side to be immersed in the liquid 250 is fitted with the bubble introduction valve 50, and the end of the introduction pipe 62 at the measurement chamber 80 is fitted with an introduction pipe connecter 81.

The introduction pipe 60 may be divided at any location, and the branch pipe 330 as described above may be inserted into this divided location. The introduction pipe 61 and the introduction pipe 62, that are divided introduction pipe 60, can be fitted to the connecting ends 331 and 332, respectively.

The branch pipe 330 includes at least a pair of directly opposite connecting ends 331, 332 and a connecting end 333 that is different from the pair of connecting ends 331, 332. The branch pipe 330 forms a straight-through channel from one introduction pipe 61 to the other introduction pipe 60, when the introduction pipe 61 and the introduction pipe 62 are connected to the connecting ends 331 and 332, respectively. The branch pipe 330 satisfying such conditions may be, for example, a T-pipe. This allows a flow path from one introduction pipe 61 to the other introduction pipe 62 to be formed so that the bubbles introduced into the introduction pipe 60 can be delivered straight into the measurement chamber 80 without being retained in the introduction pipe 60 or in the branch pipe 330.

The fitting of the branch pipe 330 to the introduction pipe 60 is not a prerequisite for dividing the introduction pipe 60. For example, the introduction pipe 61 may be fitted to one of a pair of connecting ends 331 without dividing, and the bubble introduction valve 50 or the introduction pipe connecter 81 may be mounted to the other. In this case, for example, a pipe having the same functionality as the introduction pipe 61 may be provided between the branch pipe 330 and the bubble introduction valve 50 or the introduction pipe connecter 81 as may be necessary.

In the present embodiment, a second opening/closing valve 320 is fitted to the connecting end 333 that is different from the pair of connecting ends 331, 332. In this case, a connection member may be provided between the aforementioned connecting end 333 and the second opening/closing valve 320.

As described above, the opening and closing of the second opening/closing valve 320 fitted via the branch pipe 330, together with the opening and closing of the first opening/closing valve 110, allows the observation solution 260 to be freely supplied or drained into the introduction pipe 60 or freely blocked.

The insertion position of the branch pipe 330 relative to the introduction pipe 60 is preferably adjusted to be as close as possible to the bubble introduction valve 50. Thus, it is more advantageous to ensure transparency of the observation solution 260 because the majority of the observation solution 260 in the introduction pipe 60 can be drained with the observation solution 260 in the measurement chamber 80 when the observation solution 260 is supplied from the side of the first opening/closing valve 110 or from the side of the second opening/closing valve 320 and fills the measurement chamber 80 prior to the re-supply of the observation solution 260 from the different opening/closing valves 110 and 320 from the supplied side.

The length of the introduction pipe 60 is preferably, but not limited to, at least two times larger than the inner size of the introduction pipe 60. If the length of the introduction pipe 60 is two times or less of the introduction pipe 60, solid particles introduced with bubbles through the bubble introduction valve 50 tend to reach the measurement chamber 80 when the liquid to be immersed contains solid particles, and consequently sharp images may become unobtainable.

(Bubble Introduction Valve)

In the present embodiment, the bubble introduction valve 50 is a valve body which is capable of switching between a state in which the liquid 250 containing solid particles can be moved and a state in which the movement of the liquid 250 is blocked. The bubble introduction valve 50 is either an end of the introduction pipe 60 or a portion which can be fitted to the branch pipe 330 (if the introduction pipe 60 is not divided) which is immersed in the liquid 250 containing the bubbles to be measured.

Further, the bubble introduction valve 50 is preferably a valve body that allows flow passage when the valve is opened. This effectively prevents bubbles from remaining inside the valve body. Valves that satisfy such requirements include, for example, mechanical valves such as ball valves, gate valves, butterfly valves, and the like; air inflatable valves having elastic deforming members therein; and the like.

(First Opening/Closing Valve)

In the present embodiment, the first opening/closing valve 110 is a valve body provided above the measurement chamber 80 and is fitted to a delivery pipe 85 of the measurement chamber 80. In this case, a connection member may be provided between the delivery pipe 85 and the first opening/closing valve 110. With the opening and closing of the first opening/closing valve 110, the opening and closing of the second opening/closing valve 320 can provide supplying, draining, and blocking of the observation solution 260 into the introduction pipe 60.

The first opening/closing valve 110 may be a valve body which is capable of switching between a state in which the observation solution 260 containing solid particles flowing from the liquid 250 can be moved and a state in which the movement of the observation solution 260 is blocked. The first opening/closing valve 110 does not need to be a valve body with a straight-through flow path when the valve is opened. Accordingly, a valve such as a globe valve or the like can be widely employed. Further, if the valve body allows flow passage when the valve is opened, the inside of the valve body is easily cleaned when discharging the observation solution 260, and this is preferable.

Here, the first opening/closing valve 110 preferably has a structure in which the pipe can be connected on a side different from the side to which the delivery pipe 85 is fitted. Thus, when the clear observation solution 260 is supplied from the first opening/closing valve 110 side to the measurement chamber 80, a pump 350 (hereinafter referred to as the "clear liquid pump 350") that feeds the clear observation solution 260 through the pipe can be mounted. On the other hand, when the observation solution 260 in the measurement chamber 80 is drained from the first opening/closing valve 110 side, a waste liquid tank 190 receiving the observation solution 260 to be drained may be provided downstream of the pipe.

(Second Opening/Closing Valve)

In the present embodiment, the second opening/closing valve 320 is a valve body provided below the measurement chamber 80 and is fitted to a branch pipe 330 inserted into the introduction pipe 60. Here, the second opening/closing valve 320 is preferably a valve body having a structure similar to the first opening/closing valve 110, and preferably has a structure that allows connecting of the pipe on a side different from the side to which the branch pipe 330 is fitted. Thus, when the clear observation solution 260 is supplied from the second opening/closing valve 320 side into the measurement chamber 80, the clear liquid pump 350 that feeds the clear observation solution 260 through the pipe can be mounted, while when the observation solution 260 in the measurement chamber 80 is drained from the second opening/closing valve 320 side, a waste liquid tank 190 receiving the drained observation solution 260 can be provided downstream of the pipe.

In FIG. 11, a configuration is shown in which a new observation solution 260 is introduced into the measurement chamber 80 from the first opening/closing valve 110 and drains the used observation solution 260 from the second opening/closing valve 320. However, if the pipe 340 is connected to the second opening/closing valve 320 and the pipe 180 is connected to the first opening/closing valve 110, the clear observation solution 260 is introduced into the measurement chamber 80 from the second opening/closing valve 320 and the used turbid observation solution 260 is drained from the first opening/closing valve 110 to the waste liquid tank 190.

(Opening/Closing Operations of Bubble Introduction Valve, First Opening/Closing Valve, and Second Opening/Closing Valve)

In the present embodiment, the opening and closing operations of the bubble introduction valve 50, the first opening/closing valve 110, and the second opening/closing valve 320 are performed through a power device. However, the opening and closing operations of the bubble introduction valve 50, the first opening/closing valve 110, and the second opening/closing valve 320 is not limited to operating via a power device, and may be operated manually. Examples of suitable power devices include opening/closing solenoid valves 230, 231, and 232 powered by compressed air. In the bubble introduction valve 50, a ball valve, gate valve, or butterfly valve may be combined with the opening/closing solenoid valve 230, or in the first opening/closing valve 110 or in the second opening/closing valve 320, the globe valve and the opening/closing solenoid valves 231, 232 may be combined. Additionally, the opening/closing solenoid valves 230 to 232 may be controlled via the controller 240. For example, using a programmable logic controller (hereinafter, referred to as "PLC") as the controller 240, it is easy to coordinate the opening and closing of each valve 50, 110, and 320 with the operation of the image capturing device 100 and the operation of the clear liquid pump 350. Further, the operation of supplying, draining, and blocking the observation solution 260 to the measurement chamber 80, introducing and blocking of the bubbles into the introduction pipe 60, and operating and stopping of the image capturing device 100 as a series of operations are configured. Such configuration allows continuous measurement and more efficient image-capturing can be performed, and this is preferable.

The air source 220 is the drive source for air driving the bubble introduction valve 50, the first opening/closing valve 110, and the second opening/closing valve 320. When the opening/closing solenoid valve 230 is opened, air is supplied from the air source 220 to the bubble introduction valve 50 to open or seal the bubble introduction valve 50. Similarly, when the opening/closing solenoid valves 231, 232 are opened, air is supplied from the air source 220 to the first and second opening/closing valves 110, 320 to open or seal the first and second opening/closing valves 110, 320. The air source 220 may be a source of compressed air that supplies compressed air.

(Control System of Bubble Measurement Device)

In the present embodiment, the control system of the bubble measurement device includes the controller 240 configured by a microcomputer system (for example, PLC). A control program for the operation of the bubble measurement device is pre-installed in the controller 240 to control the operation of supplying, discharging, and blocking the observation solution 260 into the measurement chamber 80, introducing and blocking of the bubbles into the introduction pipe 60, and operating and stopping the image capturing device 100 as a series of operations.

The controller 240 is connected to the opening/closing solenoid valve 230 to open and close the bubble introduction valve 50, to the opening/closing solenoid valve 231 of the first opening/closing valve 110, and to the opening/closing solenoid valve 232 of the second opening/closing valve 320. The controller 240 is connected to the image-capturing end detecting sensor 101 which is disposed in the image capturing device 100 and detects the completion of image-capturing. Here, the image-capturing end detecting sensor 101 may, for example, use an operation detecting type sensor, in which the time when the passage of bubbles through the measuring portion 83a is completed is detected as the time when the image-capturing ends. Alternatively, a timer may be used as a simpler component, and in this case, a time at which a predetermined time elapses after the image capturing device 100 starts to operate is detected as a time when the image-capturing ends. Further, the controller 240 is connected to the image capturing device 100, the image-capturing end detecting sensor 101, and the clear liquid pump 350.

In the present embodiment, a clear liquid pump 350 is provided on the first opening/closing valve 110 side to supply the clear observation solution 260 into the measurement chamber 80, and a waste liquid tank 190 is provided on the second opening/closing valve 320 side to receive the observation solution 260 drained from the measurement chamber 80.

For example, the following control can be performed on the control system of the bubble measurement device configured as described above.

Figure 12:
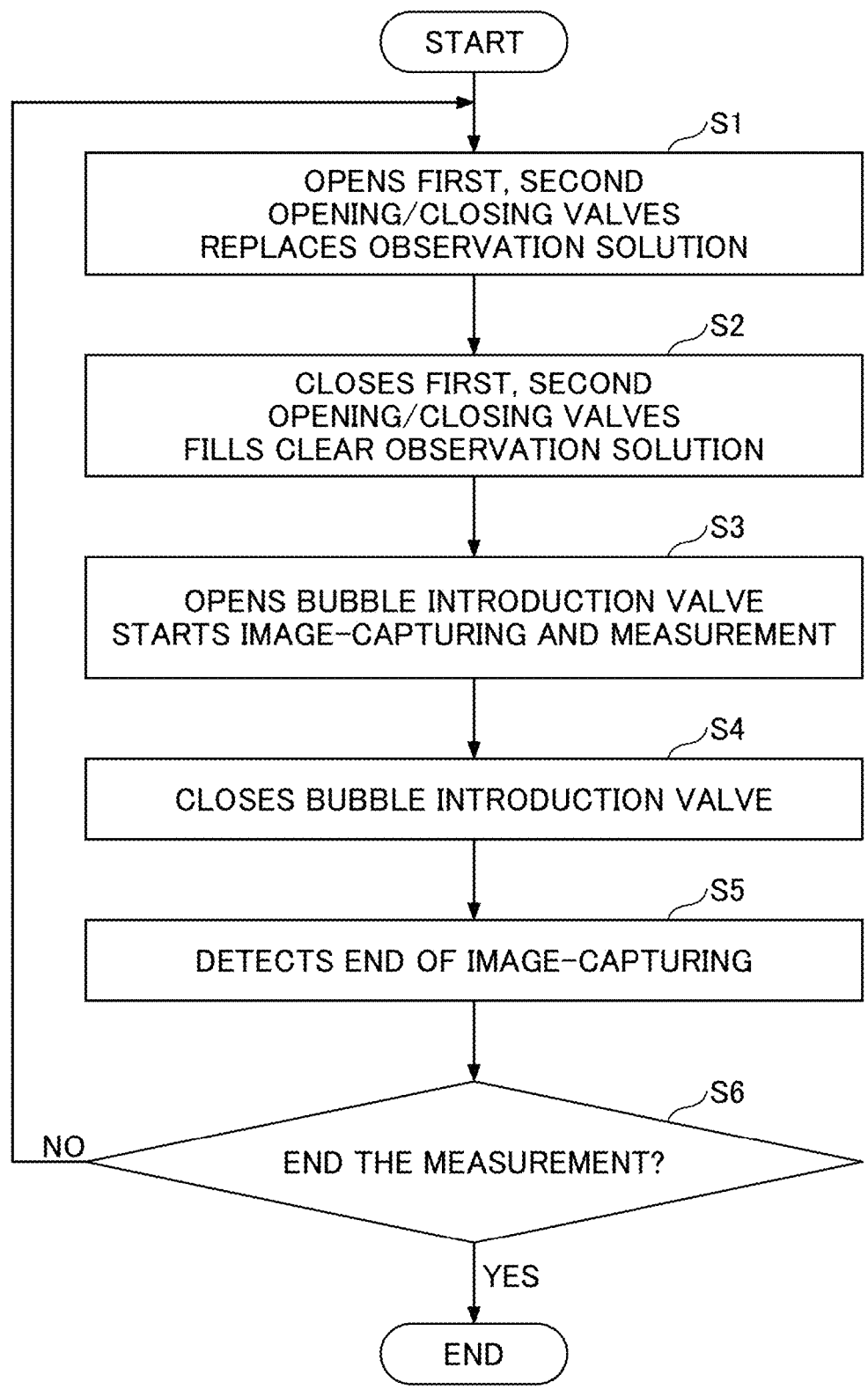
FIG. 12 is a diagram illustrating an example of a control flow of the bubble measurement device and the method of measuring bubbles of the present embodiment.

FIG. 12 is a diagram illustrating an example of a control flow of the bubble measurement device and the method of measuring bubbles of the present embodiment.

1) In Step 1 of FIG. 12, the opening/closing solenoid valve 230 of the bubble introduction valve 50 is operated to close the bubble introduction valve 50, and the opening/closing solenoid valve 231 of the first opening/closing valve 110 and the opening/closing solenoid valve 232 of the second opening/closing valve 320 are operated to open both the first opening/closing valve 110 and the second opening/closing valve 320. In addition, the clear liquid pump 350 is operated to supply the clear observation solution 260 into the measurement chamber 80 and to drain the used observation solution 260 from the measurement chamber 80.

2) In Step S2, after a predetermined period of time elapses, the opening/closing solenoid valve 231 of the first opening/closing valve 110 and the opening/closing solenoid valve 232 of the second opening/closing valve 320 are operated to close both the first opening/closing valve 110 and the second opening/closing valve 320. This results in the measurement chamber 80 being filled with a clear observation solution 260.

3) In Step S3, the opening/closing solenoid valve 230 of the bubble introduction valve 50 is operated to open the bubble introduction valve 50, and the image capturing device 100 is operated to start the image-capturing.

4) In Step S4, after a predetermined period of time has elapsed, the opening/closing solenoid valve 230 of the bubble introduction valve 50 is operated to close the bubble introduction valve 50 and to shut off the introduction of bubbles into the introduction pipe 60.

5) In Step S5, on the condition that the last bubble passes through the measuring portion 83a and is detected by the image-capturing end detecting sensor 101, the image capturing device 100 is stopped and the image capturing ends. At the end of the image-capturing, the liquid 250 containing solid particles is introduced into the observation solution 260 and turbidity is generated in the introduction pipe 60.

6) In Step S6, when the processing flow is to be ended after a measurement is performed once, the processing flow is ended, the processing flow is terminated. On the other hand, if the measurement is not completed, the first opening/closing valve 110 and the second opening/closing valve 320 are operated together with the opening/closing solenoid valve 231 of the first opening/closing valve 110 and the opening/closing valve 232 of the second opening/closing valve 320 upon completion of the image-capturing to open both the first opening/closing valve 110 and the second opening/closing valve 320. The clear liquid pump 350 is operated to supply a clear observation solution 260 toward the measurement chamber 80 and to drain the observation solution 260 from the measurement chamber 80 and the introduction pipe 60.

7) In Step S2 again, after a predetermined period of time elapses, the opening/closing solenoid valve 231 of the first opening/closing valve 110 and the opening/closing solenoid valve 232 of the second opening/closing valve 320 are operated to close the first opening/closing valve 110 and the second opening/closing valve 320 together.

8) Thereafter, Step S3 to Step S6 are performed, and if the measurement of bubbles is continued, Steps S1 to S6 are repeated. When the entire measurement is completed, the processing flow is terminated and the bubble measurement device is pulled up from the flotation machine 40. In addition, if the degree of turbidity in the measurement chamber 80 is small and is capable of distinguishing the bubbles from the ores (solid materials), it is not necessary to return to Step S1, and Steps S3 to S6 may be repeated. This reduces the interval between measurements and enables efficient measurement continuation.

In the bubble measurement device configured as described above, not only when the liquid containing the bubbles to be measured is liquid without solid particles, such as fresh water or seawater, but also when the liquid 250 contains solid particles, a clear image can be captured. In addition, even when the liquid 250 contains microscopic bubbles, the bubbles adhering to the bubble size measurement device can be washed out before capturing images. Therefore, the size and quantity of the generated bubbles can be properly determined.

Also, the opening and closing of valves alone can replace the observation solution 260 in the measurement chamber 80. Therefore, each time the observation solution 260 in the measurement chamber 80 is replaced, the bubble measurement device need not be pulled up from the flotation tank 10 in which the liquid 250 containing the bubbles to be measured is stored.

Further, the operation of supplying, draining, and blocking the observation solution 260 to the measurement chamber 80, introducing and blocking of the bubbles into the introduction pipe 60, and operating and stopping of the image capturing device 100 as a series of operations are configured. Such configuration allows continuous measurement and more efficient image-capturing can preferably be performed.

(Method of Using Bubble Size Measurement Device)

First, the user of the bubble size measurement device makes a determination such that the clear tilt surface of the measurement chamber 80 of the bubble size measurement device is at a predetermined tilt angle θ, that is, the axis of the introduction pipe 60 is vertical (see FIGS. 2A and 2B). Then, the light projection device 90 and the image capturing device 100 are prepared so that the measuring portion 83a of the measurement chamber 80 can be used for measurement. The bubble introduction valve 50 is then immersed in a container in which the liquid 250 containing the bubbles to be measured is stored. For example, the user immerses the bubble introduction valve 50 in a predetermined position in the floatation tank 10 of the floatation machine. In the present embodiment, the clear liquid pump 350 is provided on the first opening/closing valve 110 side to supply the clear observation solution 260 into the measurement chamber 80, and a waste liquid tank 190 is provided on the second opening/closing valve 320 side to receive the observation solution 260 drained from the measurement chamber 80.

The user of the bubble measurement device then closes the bubble introduction valve 50, and opens the first opening/closing valve 110 and the second opening/closing valve 320 together. In addition, the clear liquid pump 350 is operated to supply a clear observation solution 260 toward the measurement chamber 80 and to drain the observation solution 260 from the measurement chamber 80 to the waste liquid tank 190. After a predetermined period of time, the clear liquid pump 350 is stopped and the first opening/closing valve 110 and the second opening/closing valve 320 are closed. This results in a clear observation solution 260 filled in the measurement chamber 80 and introduction pipe 60.

The bubble introduction valve 50 is then opened to introduce the bubbles into the introduction pipe 60. At the same time, the image capturing device 100 is operated to start image-capturing. The bubble introduction valve 50 is opened and closed after a predetermined period of time. At this point, the image-capturing is continued. After a predetermined period of time elapses after the closing of the bubble introduction valve 50, the last bubble passes through the measuring portion 83*a* in the measurement chamber 80, at which time the image capturing device 100 is stopped and the image-capturing ends.

The first opening/closing valve 110 and the second opening/closing valve 320 are then opened together and the clear liquid pump 350 is operated to provide a clear observation solution 260 into the measurement chamber 80 and drain the used observation solution 260 from the measurement chamber 80 toward the waste liquid tank 190.

By repeating this operation, continuous measurements of bubbles can be performed.

The operation is the same as the control flow described in FIG. 12, but the opening and closing of the valve, the completion of image-capturing, and the like may be performed manually without using the controller 240. In this case, the valve is opened and closed manually, and the completion of image-capturing can be stopped after a predetermined period of time.

Thus, the bubble measurement device and the method of measuring bubbles of the present embodiment can be configured and performed without the controller 240 and the opening/closing solenoid valves 230 to 232.

It has already been described in FIG. 11 that if the pipe 340 is connected to the second opening/closing valve 320 and the pipe 180 is connected to the first opening/closing valve 110, the clear observation solution 260 is introduced from the second opening/closing valve 320 and the used observation solution 260 is drained from the first opening/closing valve 110. However, it may be configured to switch between the two valves. For example, in FIG. 11, if a branch pipe connected from the pipe 340 to the second opening/closing valve 320 and a branch pipe connected from the pipe 180 to the first opening/closing valve 110 are provided and a three-way valve is provided at the branch point, the vertical switching can be adapted.

Thus, according to the bubble measurement device and the method of measuring bubbles of the present embodiment, the measurement chamber 80 can be filled with the clear observation solution 260, and if the observation solution becomes cloudy, the observation solution 260 can be replaced with the clear observation solution 260 by an opening/closing valve operation to ensure a good measurement state.

Although an embodiment has been described in which the observation solution 260 is replaced to maintain good measurement conditions in the measurement chamber 80. Further, an embodiment to suppress a turbidity in the measurement chamber 80 and to distinguish and recognize bubbles without confusing the bubbles and the solid particles can be performed.

The contents thereof will be described below.

First, the size (identification limit value) that is the identification limit for distinguishing between the bubble 151 and solid materials is present in accordance with the resolution of the image capturing device 100 to be used. The identification limit values are described below.

Figure 13:
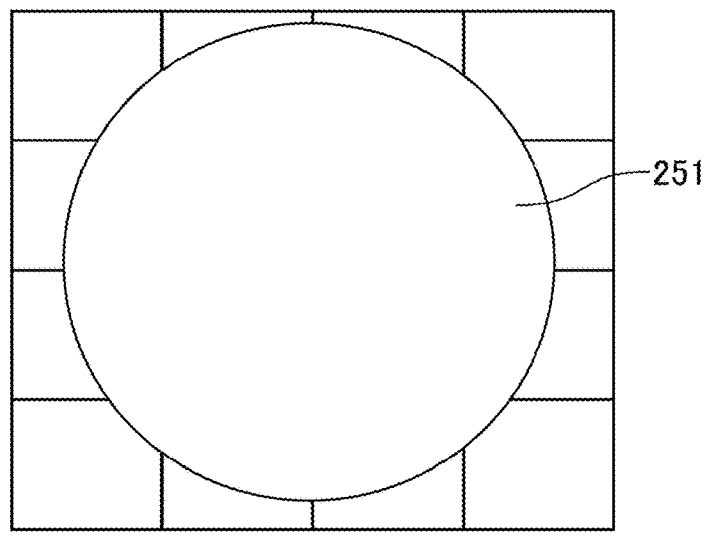
FIG. 13 is a view illustrating a bubble captured with the digital camera.

FIG. 13 is a diagram for explaining the resolution of the digital camera, and indicates a state in which a bubble 251 is captured. As illustrated in FIG. 13, the bubble 251 is often shaped to be circular or elliptical. To recognize the bubble 251, 4×4=16 pixels (image pixels) is required. If the 16 pixels are captured with a binary of 1 or 0, then the 16 pixels are 1 and the periphery is 0, and the bubble 251 is recognized as a rectangle as an image. That is, if the rectangular shape can be recognized, it can be determined that the bubble 251 has been imaged.

Figure 14:
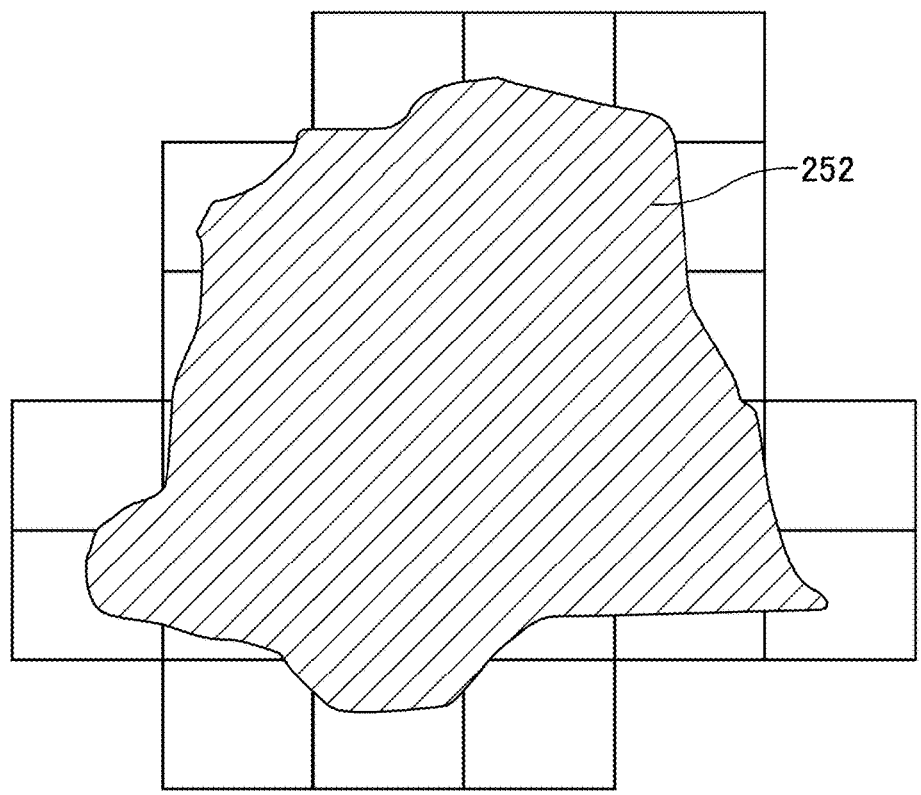
FIG. 14 is a view illustrating a mineral captured with the digital camera.

FIG. 14 is a diagram illustrating a solid material 252 captured by a digital camera. As illustrated in FIG. 14, the solid material 252 has an irregular shape with irregularities and corresponding pixels (regions recognized as 1) have irregularities. As noted above, the bubble 251 is recognized as a square or rectangular shape, but the solid material 252 is recognized as an irregular shape with irregularities, so that the shape of the captured image can be distinguished as the solid material 252 rather than as the bubble 251.

Although the example in FIG. 13 in which the bubble 251 is recognized as square or rectangular, the larger bubble 251 can be recognized as a shape that approximates a circle or an ellipse (shaped with shaved or rounded corner) rather than a square or rectangular shape. Accordingly, the image processing shape of the bubble 251 also includes such a shape. All of these shapes are symmetrical and differ from irregular shapes with irregularities in the solid material 252. Therefore, some differences in the shape of the bubble 251 can be distinguished from the shape of the solid material 252 as long as they are not below the identification limit value.

When the shape recognition of the captured image is performed, the method is not limited to the above-described method. For example, the shape recognition may be performed by the circularity of the captured image. The circularity is a numerical value that is evaluated by the ratio of the area of the recognized image to the perimeter of the recognized image to represent the complexity of the shape being rendered on the image or the like, and decreases with the maximum value being 1 as the shape becomes more complicated. The circularity can be obtained by the following formula.

$$\text{Circularity} = 4\pi \times (\text{area}) \div (\text{perimeter})^2$$

For example, in the case of a perfect circle with a radius of 10, the calculation equation is "$4\pi \times (10 \times 10 \times \pi)/(10 \times 2 \times \pi)^2$", and the circularity is 1. That is, a perfect circle is judged as the least complex shape in degrees of circularity. Similarly, the square circularity is 0.785 and the regular triangle circularity is about 0.604, and the equilateral triangle is judged to be more complex than the square.

The circularity of images of irregular shapes with unevenness, such as the solid material 252, is below 0.785. Therefore, by setting the reference value of the circularity to 0.785, an image having the circularity of 0.785 or more can be recognized as a bubble while recognizing an image having the circularity of less than 0.785 as a mineral.

Figure 15A:
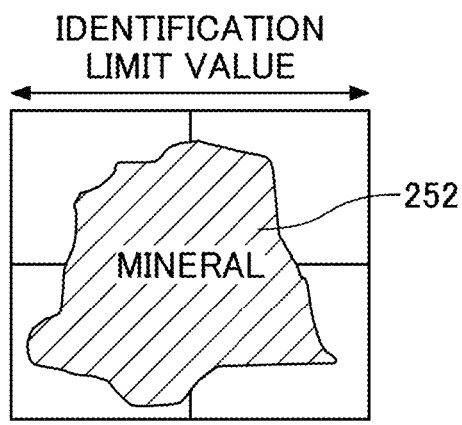
FIG. 15A is a view for explaining an identification limit value of the digital camera.
Figure 15B:
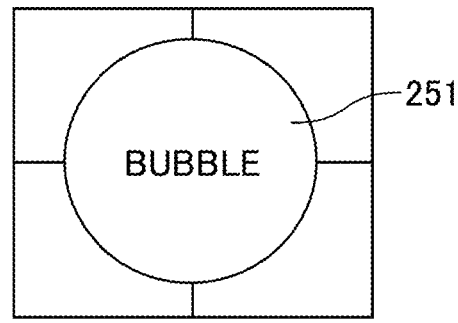
FIG. 15B is a view for explaining an identification limit value of the digital camera.

FIGS. 15A and 15B are diagrams for explaining an identification limit value of a digital camera. FIG. 15A illustrates a state in which an image of a fine particle of a solid material 252 is captured, and FIG. 15B illustrates a state in which an image of a fine bubble 251 is captured.

As illustrated in FIGS. 15A and 15B, when the solid material 252 is fine, the solid material is recognized in the form of a square or rectangular shape of 2×2=4 pixels and image capturing device recognized in the form of a square or rectangular shape similar to the bubble 251 illustrated in FIG. 15B. Accordingly, the digital camera is incapable of recognizing the solid material 252 as distinct from the bubble 251. That is, in the case of a digital camera, the length corresponding to two pixels becomes the one-sided identification limit.

The same shall apply when the shape is recognized by the circularity. In situations where the solid material 252 and the bubble 251 are imaged in the same shape, the geometry of the solid material 252 cannot be distinguished from the bubble 251 because there is no difference in the circularity of the two.

Thus, the image capturing device 100 has an inherent identification limit value, and the solid material 252 having a particulate level smaller than the identification limit value is indistinguishable from the bubble 251.

Accordingly, it is necessary to suppress the flow of solid materials 252, which are solid materials (fine particles) smaller than this identification limit value, into the measurement chamber 80.

However, it is impossible and impractical to completely control particulate inflow. When the image of the bubble 251 is captured with the image capturing device 100, it is sufficient that the inflow of particles is suppressed so that the bubble 251 and the solid materials 252 can be distinguished.

The introduction time of the bubbles 251, which can suppress the inflow of fine particles to a distinguishable extent between the bubbles 251 and the solid materials 252, can be investigated in advance according to the shape of the introduction pipe 60, the properties of the liquid constituting the liquid 250, and the amount of air supplied to the liquid 250 to form the bubbles 251 (for example, by using a tester). When the bubbles are measured by adjusting the opening time of the bubbles introducing valve 50 according to the introduction time determined by this investigation, the inflow of solid materials 252 (fine particles) smaller than the identification limit value can be suppressed from entering into the measurement chamber 80. This makes it possible to measure bubbles accurately.

The specific method for investigating the bubble introduction time is as follows.

First, at a predetermined time, the bubble introduction valve 50 is opened to collect the bubbles 151. At this time, turbidity will also be collected. Here, the opening time of the bubble introduction valve 50 is determined by the shape of the introduction pipe 60, the property of the liquid 250, and the amount of air supplied into the liquid 250.

With respect to the shape of the introduction pipe 60, the length in the longitudinal direction and the inner size of the introduction pipe 60 affect the opening time of the bubble introduction valve 50. That is, the longer the length of the introduction pipe 60, the more difficult it is for the solid particles contained in the liquid 250 to reach the measurement chamber 80. Therefore, the longer the length of the introduction pipe 60, the longer the opening time of the bubble introduction valve 50 can be set.

Further, if the inner size of the introduction pipe 60 is large, the liquid 250 and solid materials 252 contained in the liquid 250 can easily pass through the introduction pipe 60, so that it is necessary to set the opening time of the bubble introduction valve 50 to be short. On the other hand, if the inner size of the introduction pipe 60 is set to be small, the liquid 250 and solid materials 252 contained in the liquid 250 cannot pass through the introduction pipe 60, so that the opening time of the bubble introduction valve 50 can be set to be long.

Therefore, if the length of the introduction pipe 60 is set to be long and the inner size of the introduction pipe 60 is set to be small, the opening time of the bubble introduction valve 50 can be set to be long.

For example, when the inner size of the introduction pipe 60 is 50 mm or less, it has been confirmed that the opening time of the bubble introduction valve 50 can be increased by setting the length of the introduction pipe 60 to 7 times or more of the inner size of the introduction pipe 60. Specific numerical values are described later. The inner size of the introduction pipe 60 is preferably 5 mm or more. This makes it possible to measure the largest 4 mm bubble among the bubbles to be measured.

Regarding the property of the liquid 250, the particle size of the ore contained in the liquid 250 and the slurry concentration affect the opening time of the bubble introduction valve 50. The particle size of the ore is determined by the maximum and average particle sizes. The maximum particle size is literally the maximum size of the ore particles contained in the liquid 250. The average particle size is the average size of the ore particles contained in the liquid 250 and is indicated by the median size (D50) in which the larger and smaller sides are equal when the particle size distribution of the ore particles is divided into two.

The larger the ore particle size, the longer the opening time of the bubble introduction valve 50 can be set. However, in the case of the liquid 250 having a particularly large ore particle size, the turbidity does not occur during the bubble counting in the first place and the invention need not be applied. It has been confirmed that the effective ore particle size obtained by applying the present invention is 300 μm or less in maximum particle size and less than 100 μm in average particle size (median size D50).

Further, the slurry concentration is preferably less than the predetermined value because, if the concentration is too high, the proportion of ore particles increases and turbidity is likely to occur in the measurement chamber 80. For example, it has been confirmed that when the slurry concentration is set to be less than 50 wt %, the opening time of the bubble introduction valve 50 can be set to be longer. When the slurry concentration is set to 50 wt % or more, ore particles of the ore slurry 150 flow into the introduction pipe 60, easily entering the measurement chamber 80, and easily generating turbidity. Therefore, the slurry concentration is preferably adjusted to be less than 50 wt %.

For the amount of air supplied into the liquid 250, the smaller the supply amount, the longer the opening time of the bubble introduction valve 50 can be set. As the amount of air supplied increases, the bubbles 251 introduced from the bubble introduction valve 50 tend to generate a flow and allow ore particles to be easily delivered into the introduction pipe 60. Accordingly, the amount of air supplied to the liquid 250 is preferably smaller from the viewpoint of setting the opening time of the bubble introduction valve 50 longer.

Taking these parameters into account, the opening time of the bubble introduction valve 50 is adjusted. Among these parameters, the length of the introduction pipe 60 and the amount of air supplied to the liquid 250 are the factors that most influence the opening time of the bubble introduction valve 50.

In particular, when the introduction pipe 60 is set to a certain length or longer, for example, times or more the inner size of the introduction pipe 60, or 500 mm or more numerically, even though the air supply amount into the liquid 250 is high, it is often possible to distinguish and image the bubble 251 from the solid materials.

The amount of air supplied into the liquid 250 has been found to be the second most influential factor after the length of the introduction pipe 60, as will be discussed later.

During the investigation phase, the opening time of the bubble introduction valve 50 is tentatively set, while setting the parameters described above. Then, the bubble introduction valve 50 is opened to introduce the bubble 251 into the introduction pipe 60 at a set opening time. At that time, the liquid 250 is also introduced into the introduction pipe, and some turbidity is generated.

Then, the liquid 250 containing the turbidity in the measurement chamber 80 and the introduction pipe 60 is sampled to determine the particle size distribution of the solid materials 252 contained in the liquid 250.

If a peak in the particle size distribution of the solid materials 252 contained in the liquid 250 is observed in the particle size range smaller than the identification limit value of the image capturing device 100, it is determined as NG. On the other hand, when no peaks in the particle size distribution of the solid materials 252 are observed in the particle size range smaller than the identification limit value of the image capturing device 100, it is determined as OK. The identification limit value of the image capturing device 100 is needed to be confirmed in advance.

When determined as OK in the above criteria, the opening time of the first set bubble introduction valve 50 is adopted as the introduction time of the bubbles 251 and solid materials 252 that can control the inflow of particulates to a discernible degree.

Such an investigation is carried out by setting the opening time of the various bubble introduction valves 50 while varying the parameters described above to determine if peaks in the particle size distribution of the solid materials 252 contained in the liquid 250 are observed in the particle size range less than the identification limit value of the image capturing device, and the opening time of the bubble introduction valve 50 is adjusted.

At that time, while considering qualitative characteristics such as allowing the opening time of the bubble introduction valve 50 to be longer as the introduction pipe 60 is longer, allowing the opening time of the bubble introduction valve 50 to be longer as the amount of air supplied to the liquid 250 is smaller, the opening time of the bubble introduction valve 50 can be longer, the opening time of the bubble introduction valve 50 is set while predicting, determined, and adjusted. These are then changed as the properties of the liquid 250 change, so each of them is set in accordance with the properties of the liquid 250.

This allows conditions to be set for the various liquids 250 to reliably measure bubbles 251.

As described above, according to the bubble measurement device and the method of measuring bubbles according to the present embodiment, the opening time of the appropriate bubble introduction valve 50 corresponding to the various liquids 250 can be set, the bubbles 251 can be separately recognized from the solid materials 252, and the bubble data such as the bubble size and the number of bubbles density can be accurately and reliably measured.

By combining such method of measuring bubbles, the observation solution 260 can be easily replaced while increasing the measuring accuracy in a single clear observation solution 260, and extremely accurate bubble measuring can be easily performed continuously, thereby significantly improving the accuracy and efficiency of the bubble measurement.

It should be noted that the first embodiment and the second embodiment can be combined. Both of them are related to the measurement of bubbles and are in the common technical field. Therefore, they can be combined without any inconsistency.

While the preferred embodiments of the invention have been described in detail above, the invention is not limited to the embodiments described above, and various modifications and substitutions can be made to the embodiments described above without departing from the scope of the invention.

The invention claimed is:

1. A bubble measurement device for measuring bubbles moving in a liquid, the bubble measurement device comprising:
   a measurement chamber in which the bubbles in the liquid containing solid materials are introduced into the measurement chamber from below the measurement chamber, and providing a transparent slope facing diagonally downward at a position where the introduced bubbles rise;
   an image capturing device to capture an image of the bubbles passing the transparent slope;
   an introduction pipe provided below the measurement chamber to introduce the bubbles into the measurement chamber; and
   a bubble introduction valve that is immersed in the liquid to be measured and performs the introduction of bubbles into the introduction pipe and blocking of the bubbles from entering into the introduction pipe,
   wherein an opening time of the bubble introduction valve is determined according to a shape of the introduction pipe, properties of the liquid, and an amount of air supplied into the liquid, and the opening time of the bubble introduction valve is adjusted to a predetermined time so that the bubbles contained in the liquid and the solid materials are distinguishable when the image of the bubbles in the measurement chamber is captured by the image capturing device.

2. The bubble measurement device according to claim 1, wherein a time of introducing the bubbles into the introduction pipe during which the bubbles are distinguishable from the solid materials is adjusted to a time determined in advance.

3. The bubble measurement device according to claim 1, wherein the shape of the introduction pipe includes a length of the introduction pipe, and
   wherein the opening time of the bubble introduction valve is set to be longer as the length of the introduction pipe increases.

4. The bubble measurement device according to claim 1, wherein the opening time of the bubble introduction valve is set to be longer as the amount of air supplied to the liquid decreases.

5. The bubble measurement device according to claim 1, wherein the opening time of the bubble introduction valve is set to a predetermined time of 10 seconds or less when the length of the introduction pipe is 7 times or more and less than 20 times an inner size of the introduction pipe and the amount of air supplied is greater than 0.6 L/min and 4.0 L/min or less relative to 1 L of the liquid.

6. The bubble measurement device according to claim 1, wherein the opening time of the bubble introduction valve is set to a predetermined time of 40 seconds or less when the length of the introduction pipe is 7 times or more and less than 20 times the inner size of the introduction pipe and the amount of air supplied is greater than 0.2 L/min and 0.6 L/min or less relative to 1 L of the liquid.

7. The bubble measurement device according to claim 1, wherein the opening time of the bubble introduction valve is set to a predetermined time of 60 seconds or less when the length of the introduction pipe is 20 times or more the inner size of the introduction pipe and the amount of air supplied is greater than 0.2 L/min and 4.0 L/min or less relative to 1 L of the liquid.

8. The bubble measurement device according to claim 1, wherein the inner size of the introduction pipe is 5 mm or more and 50 mm or less.

9. The bubble measurement device according to claim 1, wherein the bubble introduction valve is an automatic opening and closing valve.

10. A bubble measurement device for measuring bubbles moving in a liquid, the bubble measurement device comprising:
a measurement chamber holding the liquid, introducing the bubbles in the liquid into the measurement chamber from below the measurement chamber, and providing a transparent slope facing diagonally downward at a position where the introduced bubbles rise;
an image capturing device to capture an image of the bubbles passing the transparent slope;
an introduction pipe provided below the measurement chamber to introduce the bubbles into the measurement chamber; and
a bubble introduction valve that is immersed in the liquid containing bubbles to be measured and performs the introduction of bubbles into the introduction pipe and blocking of the bubbles from entering into the introduction pipe;
a first opening/closing valve disposed above the measurement chamber to shut off a supply or draining of an observation solution into the measurement chamber; and
a second opening/closing valve disposed below the measurement chamber to shut off a supply or drain of the observation solution into the measurement chamber,
wherein an opening time of the bubble introduction valve is determined according to a shape of the introduction pipe, properties of the liquid, and an amount of air supplied into the liquid, and the opening time of the bubble introduction valve is adjusted to a predetermined time so that the bubbles contained in the liquid and the solid materials are distinguishable when the image of the bubbles in the measurement chamber is captured by the image capturing device.

11. The bubble measurement device according to claim 10, wherein the liquid containing the bubbles to be measured is a slurry-like liquid containing a solid content.

12. The bubble measurement device according to claim 10, wherein the liquid containing the bubbles to be measured is a liquid containing microbubbles.

13. The bubble measurement device according to claim 10, wherein the second opening/closing valve is disposed near a lower end of a region that is not immersed in the liquid of the introduction pipe.

14. The bubble measurement device according to claim 10, comprising:
a first opening/closing driving unit to perform the first opening/closing of the valve;
a second opening/closing driving unit to perform the second opening and closing of the valve;
a bubble introduction valve driving unit to open and close the bubble introduction valve;
an image capturing unit to capture the bubbles passing the transparent slope;
an image-capturing end detecting sensor unit to detect an end of image-capturing of the bubbles passing the transparent slope;
an observation solution source unit to supply a clear observation solution to the measurement chamber; and
a controller in which the first opening/closing valve and the second opening/closing valve are opened together, the clear observation solution is supplied to the measurement chamber via one of the opening/closing valves, and the observation solution is drained from the measurement chamber via the other opening/closing valve on a side different from the side to supply the clear observation solution,
after a predetermined period of time, the supply of the clear observation solution is stopped, the first opening/closing valve and the second opening/closing valve are both closed, and the bubble introduction valve is opened to capture an image of the bubbles, and
after a predetermined period of time, the bubble introduction valve is closed, and the image-capturing is stopped upon detection by the image-capturing end detecting sensor of a condition in which the end of the image-capturing is detected.

15. The bubble measurement device according to claim 10, further comprising:
a pump connected to one of the first opening/closing valve and the second opening/closing valve and configured to supply the observation solution; and
a drain pipe connected to the other of the first opening/closing valve and the second opening/closing valve and capable of discharging the used observation solution.

* * * * *